(12) United States Patent
Asai

(10) Patent No.: US 9,876,242 B2
(45) Date of Patent: Jan. 23, 2018

(54) FUEL CELL SYSTEM

(71) Applicant: NISSAN MOTOR CO., LTD., Yokohama-shi, Kanagawa (JP)

(72) Inventor: Yoshitomo Asai, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/519,933

(22) PCT Filed: Sep. 16, 2015

(86) PCT No.: PCT/JP2015/076334
§ 371 (c)(1),
(2) Date: Apr. 18, 2017

(87) PCT Pub. No.: WO2016/067781
PCT Pub. Date: May 6, 2016

(65) Prior Publication Data
US 2017/0331129 A1    Nov. 16, 2017

(30) Foreign Application Priority Data

Oct. 28, 2014    (JP) .................................. 2014-219709

(51) Int. Cl.
| H01M 8/0438 | (2016.01) |
| H01M 8/04223 | (2016.01) |
| H01M 8/04992 | (2016.01) |
| H01M 8/04119 | (2016.01) |

(52) U.S. Cl.
CPC ... *H01M 8/04425* (2013.01); *H01M 8/04179* (2013.01); *H01M 8/04231* (2013.01); *H01M 8/04388* (2013.01); *H01M 8/04992* (2013.01); *H01M 2250/20* (2013.01)

(58) Field of Classification Search
None
See application file for complete search history.

(56) References Cited

U.S. PATENT DOCUMENTS

| 2005/0142400 A1 | 6/2005 | Turco et al. |
| 2009/0035614 A1 | 2/2009 | Wake et al. |
| 2012/0156575 A1 | 6/2012 | Di Fiore et al. |

(Continued)

FOREIGN PATENT DOCUMENTS

| JP | 2008-041329 A | 2/2008 |
| JP | 2008-097973 A | 4/2008 |
| JP | 2009-037951 A | 2/2009 |

(Continued)

OTHER PUBLICATIONS

U.S. Appl. No. 15/521,460, filed Apr. 24, 2017, Nissan Motor Co., Ltd.

*Primary Examiner* — Sarah A Slifka
(74) *Attorney, Agent, or Firm* — Foley & Lardner LLP

(57) ABSTRACT

A fuel cell system (100) includes a hydrogen supply valve (33) that controls a supply of the anode gas into an anode system, a purge valve (36) that discharges an off-gas from the anode system, a pressure detecting unit (34) configured to measure a pressure inside the anode system, and a purge flow rate estimating unit (4) configured to estimate a purge flow rate of the off-gas discharged from the anode system through the purge valve (36) based on a pressure decrease in a purge valve open state and a pressure decrease in a purge valve close state when an anode gas supply into the anode system stops.

11 Claims, 18 Drawing Sheets

(56) References Cited

U.S. PATENT DOCUMENTS

2015/0017562 A1    1/2015   Ichikawa et al.
2015/0044582 A1    2/2015   Chikugo et al.

FOREIGN PATENT DOCUMENTS

| JP | 2009-193838 A | 8/2009 |
| WO | WO-2013/129453 A1 | 9/2013 |
| WO | WO 2013/137271 A1 | 9/2013 |

FUEL CELL SYSTEM

TECHNICAL FIELD

This invention relates to a fuel cell system.

BACKGROUND ART

In the prior art, there is known a fuel cell system, in which a gas amount discharged from the anode system is computed based on a pressure change inside the anode system in the downstream from the hydrogen supply valve while a supply of hydrogen to the fuel cell stops by closing the hydrogen supply valve (refer to US 2012/0,156,575 A1).

SUMMARY OF INVENTION

While the purge valve is closed during the operation of the fuel cell system, nitrogen and the like transmitted from the cathode of the fuel cell to the anode through an electrode membrane are accumulated in the anode system, so that the hydrogen concentration inside the anode system gradually decreases. As the hydrogen concentration inside the anode system decreases, a voltage drop may occur during the operation of the fuel cell system.

In order to prevent such a voltage drop, the off-gas containing nitrogen or hydrogen is discharged from the inside of the anode system through the purge valve by opening the purge valve as necessary, so that the hydrogen concentration inside the anode system is maintained such that the voltage drop does not occur. In this case, in order to determine whether or not the hydrogen concentration inside the anode system is appropriately maintained, it is necessary to estimate the amount of the off-gas (purging amount) discharged from the inside of the anode system through the purge value with high accuracy. Such a necessity of estimating the purging amount with high accuracy is caused by a fact that the hydrogen concentration inside the anode system changes depending on the purging amount and increases as the purging amount increases.

However, the amount of the off-gas discharged from the inside of the anode system computed using a technique of the prior art described above is influenced by a gas leaking from the inside of the anode system in addition to the purge gas purged through the purge valve. The gas leaking from the inside of the anode system is typically hydrogen transmitted from the anode of the fuel cell to the cathode through the electrolytic membrane. As hydrogen transmits from the anode of the fuel cell to the cathode, the hydrogen concentration inside the anode system decreases.

That is, while the purge gas contributes to an increase of the hydrogen concentration inside the anode system, the transmitted hydrogen contributes to a decrease of the hydrogen concentration inside the anode system.

Therefore, in order to manage the hydrogen concentration based on the gas amount discharged from the inside of the anode system computed using the technique of the prior art described above, the hydrogen concentration is reduced more than the anticipated amount due to an influence from the hydrogen leaking from the inside of the anode system, so that an unanticipated voltage drop may occur.

In view of such problems, this invention has been made to estimate the flow rate of the off-gas discharged from the inside of the anode system through the purge valve with high accuracy by excluding, from the purge gas, an influence from a factor that changes a pressure inside the anode system for purposes other than the purging, and particularly, an influence from hydrogen leaking from the inside of the anode system.

According to an aspect of this invention, there is provided a fuel cell system having a fuel cell supplied with an anode gas and a cathode gas to generate electricity from the fuel cell depending on a load. The fuel cell system comprises a supply valve for supplying the anode gas into an anode system of the fuel cell system, a purge valve for discharging an off-gas from the anode system, a pressure detecting unit configured to estimate or measures a pressure inside the anode system, and a purge flow rate estimating unit configured to estimate a purge flow rate of the off-gas discharged from the anode system through the purge valve based on a pressure decrease in a purge valve open state and a pressure decrease in a purge valve close state when the anode gas supply into the anode system stops.

DESCRIPTION OF EMBODIMENTS

Hereinafter, an embodiment of this invention will be described with reference to the accompanying drawings.

A fuel cell generates electricity by interposing an electrolytic membrane between an anode (fuel electrode) and a cathode (oxidant electrode) and supplying an anode gas (fuel gas) containing hydrogen to the anode and a cathode gas (oxidant gas) containing oxygen to the cathode. Electrode reactions generated in both the anode and the cathode are expressed as follows.

$$\text{anode: } 2H_2 \rightarrow 4H^+ + 4e^- \quad (1)$$

$$\text{cathode: } 4H^+ + 4e^- + O_2 \rightarrow 2H_2O \quad (2)$$

Through the electrode reactions (1) and (2), the fuel cell generates an electromotive force of approximately 1 V.

In order to use such a fuel cell as a power source of a vehicle, a fuel cell stack obtained by stacking several hundreds of fuel cells is employed because high electric power is necessary. In addition, a fuel cell system is provided to supply the anode gas and the cathode gas to the fuel cell stack, so that electric power for driving a vehicle is extracted.

Figure 1:
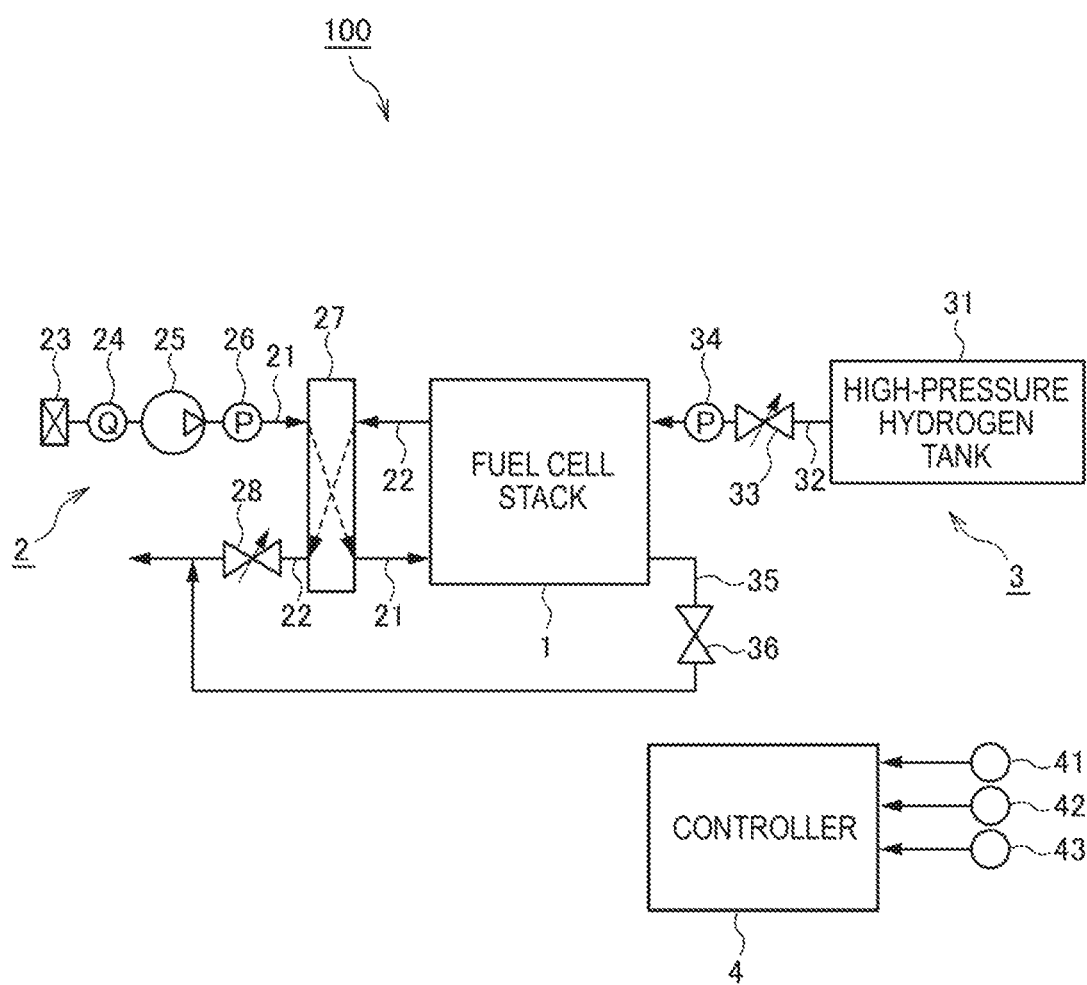
FIG. 1 is a schematic diagram illustrating a fuel cell system according to an embodiment of this invention.

FIG. 1 is a schematic configuration diagram illustrating a fuel cell system 100 according to an embodiment of this invention.

The fuel cell system 100 comprises a fuel cell stack 1, a cathode gas supply/discharge unit 2, an anode gas supply/discharge unit 3, and a controller 4.

The fuel cell stack 1 is obtained by stacking a plurality of fuel cells. The fuel cell stack 1 is supplied with an anode gas and a cathode gas to generate electric power necessary to drive a vehicle.

The cathode gas supply/discharge unit 2 comprises a cathode gas supply passage 21, a cathode gas discharge passage 22, a filter 23, an air flow sensor 24, a cathode compressor 25, a cathode pressure sensor 26, a water recovery device (hereinafter, referred to as a "WRD") 27, and a cathode pressure control valve 28. The cathode gas supply/discharge unit 2 supplies the fuel cell stack 1 with the cathode gas and discharges the cathode off-gas discharged from the fuel cell stack 1 to the atmosphere.

The cathode gas supply passage 21 is a passage for flowing the cathode gas supplied to the fuel cell stack 1. One end of the cathode gas supply passage 21 is connected to the filter 23, and the other end is connected to the cathode gas inlet hole of the fuel cell stack 1.

The cathode gas discharge passage 22 is a passage for flowing the cathode off-gas discharged from the fuel cell stack 1. One end of the cathode gas discharge passage 22 is connected to the cathode gas outlet hole of the fuel cell stack 1, and the other end is opened. The cathode off-gas is a mixture gas between the cathode gas and water vapor generated through the electrode reactions.

The filter 23 is used to remove a foreign object out of the cathode gas input to cathode gas supply passage 21.

The air flow sensor 24 is provided in the cathode gas supply passage 21 in the upstream from the cathode compressor 25. The air flow sensor 24 detects a flow rate of the cathode gas supplied to the cathode compressor 25 and supplied finally to the fuel cell stack 1.

The cathode compressor 25 is provided in the cathode gas supply passage 21. The cathode compressor 25 inputs the air (the atmospheric air) as a cathode gas to the cathode gas supply passage 21 through the filter 23 and supplies it to the fuel cell stack 1.

The cathode pressure sensor 26 is provided in the cathode gas supply passage 21 between the cathode compressor 25 and the WRD 27. The cathode pressure sensor 26 detects a pressure of the cathode gas supplied to the fuel cell stack 1 (hereinafter, referred to as a "cathode pressure").

The WRD 27 is connected to each of the cathode gas supply passage 21 and the cathode gas discharge passage 22 to recover moisture in the cathode off-gas flowing through the cathode gas discharge passage 22 and use the recovered moisture to humidify the cathode gas flowing through the cathode gas supply passage 21.

The cathode pressure control valve 28 is provided in the cathode gas discharge passage 22 in the downstream from the WRD 27. The open/close state of the cathode pressure control valve 28 is controlled by the controller 4 to control a pressure of the cathode gas supplied to the fuel cell stack 1. It is noted that, according to this embodiment, the cathode pressure is controlled to a desired pressure (target cathode pressure) basically by adjusting a rotation speed of the cathode compressor 25 and an opening level of the cathode pressure control valve 28.

The anode gas supply/discharge unit 3 supplies the fuel cell stack 1 with the anode gas and discharges the anode off-gas discharged from the fuel cell stack 1 into the cathode gas discharge passage 22. The anode gas supply/discharge unit 3 comprises a high-pressure hydrogen tank 31, an anode gas supply passage 32, a hydrogen supply valve 33, an anode pressure sensor 34, an anode gas discharge passage 35, and a purge valve 36.

The high-pressure hydrogen tank 31 maintains and stores the anode gas supplied to the fuel cell stack 1 in a high pressure state.

The anode gas supply passage 32 is a passage for supplying the anode gas discharged from the high-pressure hydrogen tank 31 to the fuel cell stack 1. One end of the anode gas supply passage 32 is connected to the high-pressure hydrogen tank 31, and the other end is connected to the anode gas inlet hole of the fuel cell stack 1.

The hydrogen supply valve 33 is provided in the anode gas supply passage 32. The open/close operation of the hydrogen supply valve 33 is controlled by the controller 4 to adjust a pressure of the anode gas supplied to the fuel cell stack 1 to a desired pressure. In addition, by controlling the open/close operation of the hydrogen supply valve 33, the flow rate of the anode gas supplied to the fuel cell stack 1 is also controlled.

The anode pressure sensor 34 is provided in the anode gas supply passage 32 in the downstream from the hydrogen supply valve 33. The anode pressure sensor 34 detects a pressure of the anode gas supply passage 32 in the downstream from the hydrogen supply valve 33. According to this embodiment, the pressure detected by the anode pressure sensor 34 is used as a pressure inside the anode system (hereinafter, referred to as an "anode pressure") from the hydrogen supply valve 33 to the purge valve 36.

The anode gas discharge passage 35 is a passage for flowing the anode off-gas discharged from the fuel cell stack 1. The anode off-gas is a mixture gas between the remaining hydrogen (anode gas) not used in the electrode reactions, and nitrogen or water vapor transmitted from the cathode side to the anode side through an electrolytic membrane. One end of the anode gas discharge passage 35 is connected to the anode gas outlet hole of the fuel cell stack 1, and the other end is connected to the cathode gas discharge passage 22.

The anode off-gas discharged to the cathode gas discharge passage 22 is mixed with the cathode off-gas in the cathode gas discharge passage 22 and is discharged to the outside of the fuel cell system 100. Since the anode off-gas contains the remaining hydrogen not used in the electrode reactions, the anode off-gas is mixed with the cathode off-gas and is discharged to the outside of the fuel cell system 100 to maintain a hydrogen concentration in the discharged gas at a predetermined concentration or lower.

The purge valve 36 is provided in the anode gas discharge passage 35. The open/close operation of the purge valve 36 is controlled by the controller 4 to control a flow rate of the anode off-gas (hereinafter, referred to as a "purge flow rate") discharged from the inside of the anode system to the cathode gas discharge passage 22.

The controller 3 is a microcomputer comprising a central processing unit (CPU), a read-only memory (ROM), a random access memory (RAM), and an input/output interface (I/O interface).

The controller 4 receives signals from various sensors for detecting an operation state of the fuel cell system 100, such as an accelerator stroke sensor 41 for detecting a depression level of an accelerator pedal (hereinafter, referred to as an "accelerator manipulation amount"), a temperature sensor 42 for detecting a temperature of the coolant (hereinafter, referred to as a "stack temperature") for cooling the fuel cell stack, and a current sensor 43 for detecting an output current of the fuel cell stack in addition to the air flow sensor 24 described above.

The controller 4 computes a target output current of the fuel cell stack 1 based on an operation state of the fuel cell system 100. Specifically, the controller 4 computes the target output current of the fuel cell stack 1 based on a request of power from a driving motor (not illustrated) for driving a vehicle, requests of power from accessories such as cathode compressor 25, and a charge/discharge request from a battery (not illustrated).

The controller 4 performs pulsating operation for increasing/decreasing the anode pressure periodically based on an operation state of the fuel cell system 100. In the pulsating operation, basically, the anode pressure is pulsated by periodically increasing or decreasing the anode pressure within a range of the pulsation upper limit pressure and the pulsation lower limit pressure set depending on the target output current of the fuel cell stack 1. By performing this pulsating operation, it is possible to obtain water drainability by discharging liquid water inside the anode system to the outside of the anode system when the anode pressure increases.

Here, during electricity generation of the fuel cell stack 1, nitrogen or water vapor is transmitted from the cathode side to the anode side through the electrolytic membrane. For this reason, if the purge valve 36 remains in a closed state, hydrogen is consumed in the fuel cell stack 1, and the transmitted nitrogen and the like are accumulated in the anode system. As a result, even when a pressure inside the anode system (anode pressure) is controlled to the same pressure, the hydrogen concentration inside the anode system gradually decreases as much as the transmitted nitrogen and the like. In this manner, if electricity is generated while the hydrogen concentration inside the anode system decreases, hydrogen necessary to generate electricity inside the fuel cell stack 1 becomes short, and a voltage drop may occur even when the anode pressure is controlled to a target value.

Meanwhile, when the purge valve 36 is opened, nitrogen and the like accumulated in the anode system are discharged from the inside of the anode system as an anode off-gas. Therefore, the hydrogen concentration inside the anode system increases (is recovered). That is, the hydrogen concentration inside the anode system changes depending on the amount of the anode off-gas (hereinafter, referred to as a "purging amount") discharged from the inside of the anode system through the purge valve 36. Specifically, as the purging amount increases, the hydrogen concentration inside the anode system increases.

In this regard, according to this embodiment, a threshold value of the purge flow rate (or purging amount) is obtained in advance through experiments or the like, at which the hydrogen concentration inside the anode system does not generate a voltage drop (target hydrogen concentration: for example, 60%) depending on a load of the fuel cell. In addition, the purge flow rate when the purge valve 36 is opened is estimated, and the estimated purge flow rate is compared with the threshold value. If the estimated purge flow rate is equal to or lower than the threshold value, it is determined that the purging amount necessary to manage the hydrogen concentration inside the anode system at the target hydrogen concentration is short, and an additional purging operation is performed.

Here, as a method of estimating the purging amount, for example, it is conceived that a gas amount flowing out from the anode system during a purge valve 36 open duration is estimated based on the anode pressure decrease amount during the purge valve open duration in the hydrogen supply valve close state, and a value obtained by subtracting the hydrogen amount consumed for generating electricity during the purge valve open duration from this gas amount is estimated as the amount of the anode off-gas discharged from the anode system through the purge valve 36, that is, the purging amount (if this purging amount is divided by the duration, the purge flow rate is obtained).

However, the gas flowing out from the anode system during the close operation of the hydrogen supply valve 33 contains components other than the gas flowing out through the purge valve 36 (hereinafter, referred to as a "purge gas") or the hydrogen consumed by generating electricity. For example, the hydrogen transmitted from the anode side to the cathode side through the electrolytic membrane (hereinafter, referred to as a "transmitted hydrogen") or the water vapor which is liquid water condensed in the anode system are included. The transmitted hydrogen contributes to a decrease of the hydrogen concentration in the anode system. In addition, since hydrogen has a small molecular weight, the amount of hydrogen transmitting through the electrolytic membrane is not negligible.

In this manner, while the purge gas contributes to an increase of the hydrogen concentration in the anode system, the transmitted hydrogen contributes to a decrease of the hydrogen concentration in the anode system.

Therefore, typically, if a ratio of the transmitted hydrogen amount increases out of the purging amount estimated according to the estimation method described above, the hydrogen concentration in the anode system is recovered as the purging amount increases; however, the recovery amount is reduced. Therefore, if the transmitted hydrogen amount is neglected and is included in the purging amount, the actual hydrogen concentration in the anode system is lowered than the assumed value even when the purge flow rate is equal to or higher than the threshold value. This may generate an unanticipated voltage drop.

In this regard, according to this embodiment, only the gas flowing out through the purge valve 36 (purge gas) is computed as the purging amount. Hereinafter, a purging amount computation method according to this embodiment will be described with reference to FIGS. 2 and 3.

Figure 2:
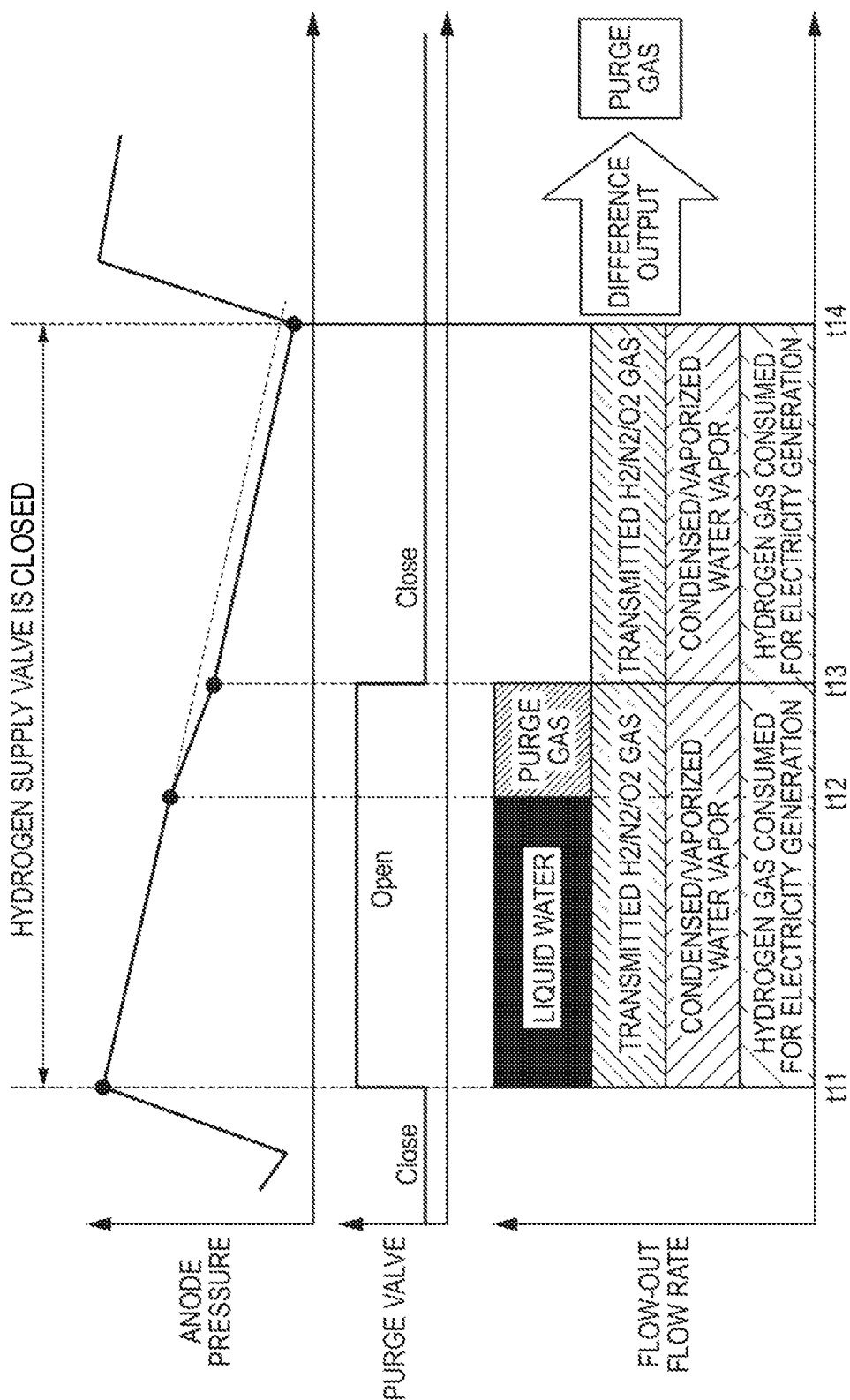
FIG. 2 is a diagram illustrating a purging amount computation method according to an embodiment of this invention.
Figure 3:
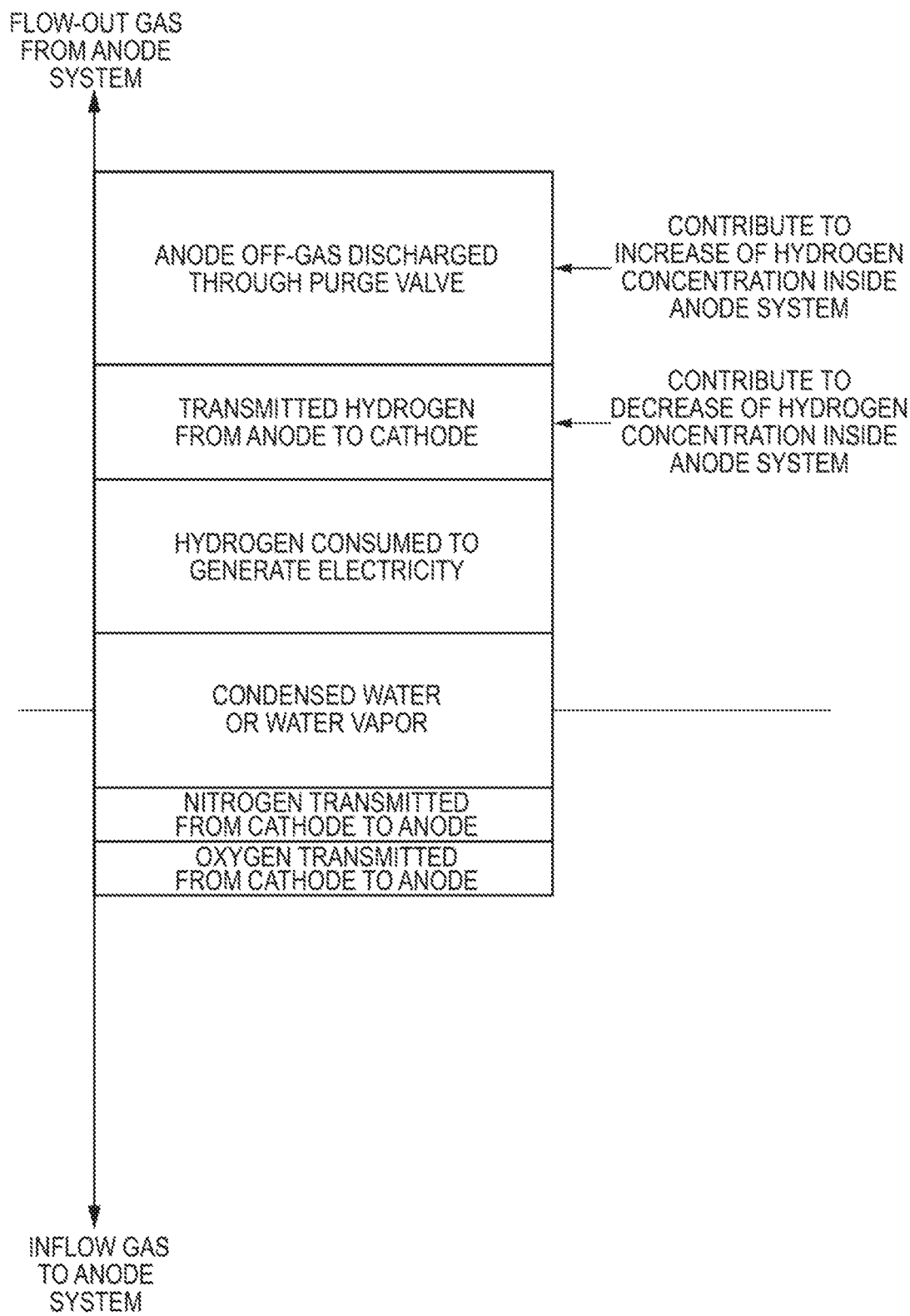
FIG. 3 is a diagram illustrating a gas input/output flow in an anode system in a hydrogen supply valve close state.

FIG. 2 is a diagram illustrating a purging amount computation method according to this embodiment. FIG. 3 is a diagram illustrating a gas input/output operation in the anode system in the hydrogen supply valve 33 close state.

According to this embodiment, only the gas (purge gas) flowing out through the purge valve 36 is computed as a purging amount based on the pressure decrease during a purge valve 36 open duration in the hydrogen supply valve 33 close state and a pressure decrease during a purge valve 36 close duration in the hydrogen supply valve 33 close state.

As illustrated in FIG. 2, as the hydrogen supply valve 33 is closed at the timing t11 during electricity generation of the fuel cell stack 1, so that the supply of the anode gas to the fuel cell stack 1 stops, the anode pressure gradually decreases. This change of the anode pressure is generated due to the following reasons.

Referring to FIG. 2, the purge valve 36 is opened from the timing t11 to the timing t13, and is closed from the timing t13 to the timing t14. A description will be made for factors of changing the anode pressure regardless of the open/close state of the purge valve 36.

First, a first factor is hydrogen inside the anode system consumed by generating electricity in the hydrogen supply valve 33 close state. This hydrogen consumed for generating electricity lowers the anode pressure. A second factor is a fact that liquid water inside the anode system is vaporized and changes to water vapor, or reversely, water vapor is condensed and changes to liquid water. The anode pressure changes depending on the balance between the vaporization and condensation. A third factor is hydrogen (transmitted hydrogen) transmitted from the anode side to the cathode side through the electrolytic membrane, or nitrogen and oxygen reversely transmitted from the cathode side to the anode side through the electrolytic membrane. The anode pressure changes depending on the balance of these transmitted gases.

Since the purge valve 36 is closed from the timing t13 to the timing t14, the anode pressure decreases due to the three factors.

Meanwhile, since the purge valve 36 is opened from the timing t11 to the timing t13, the anode pressure decreases due to the gas (purge gas) flowing out through the purge valve 36 in addition to the three factors. It is noted that, due to the structure of the purge valve 36, as the purge valve 36 is opened, first, liquid water is discharged, and the anode off-gas is then discharged as the purge gas. Therefore, as illustrated in FIG. 2, the anode off-gas is discharged from the timing t12.

In this regard, according to this embodiment, the gas amount inside the anode system lost by the three factors during the purge valve close duration (timing t13 to t14) is obtained based on a pressure decrease during the purge valve close duration (timing t13 to t14) in which the purge valve 36 is closed in the hydrogen supply valve 33 close state. By dividing this gas amount by the purge valve close duration, it is possible to compute the gas amount inside the anode system per unit time lost by the three factors.

Similarly, the gas amount inside the anode system lost by the purging operation in addition to the three factors during the purge valve open duration is obtained based on the pressure decrease of the purge valve open duration (timing t11 to t13). In addition, by dividing this gas amount by the purge valve open duration, the gas amount inside the anode system per unit time lost by the purging operation in addition to the three factors during the purge valve open duration is computed.

Here, it is conceived that the gas amount inside the anode system per unit time lost by the three factors even in the purge valve open duration from the timing t11 to the timing t13 is, basically, not different from that of the purge valve close duration.

Therefore, by subtracting the gas amount inside the anode system per unit time lost by the three factors during the purge valve close duration from the gas amount inside the anode system per unit time lost by the purging operation in addition to the three factors during the purge valve open duration, it is possible to compute the flow rate only of the gas (purge gas) flowing out through the purge valve 36 with high accuracy.

Hereinafter, a purge control operation according to this embodiment will be described with reference to FIGS. 4 to 13.

Figure 4:
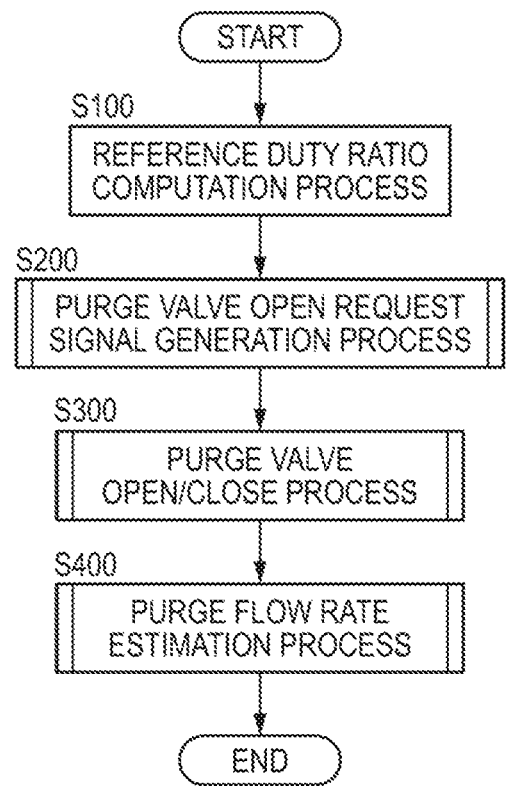
FIG. 4 is a flowchart illustrating a purge control according to an embodiment of this invention.

FIG. 4 is a flowchart illustrating a purge control operation according to this embodiment. The controller 4 executes this routine repeatedly at a predetermined operation cycle.

Figure 5:
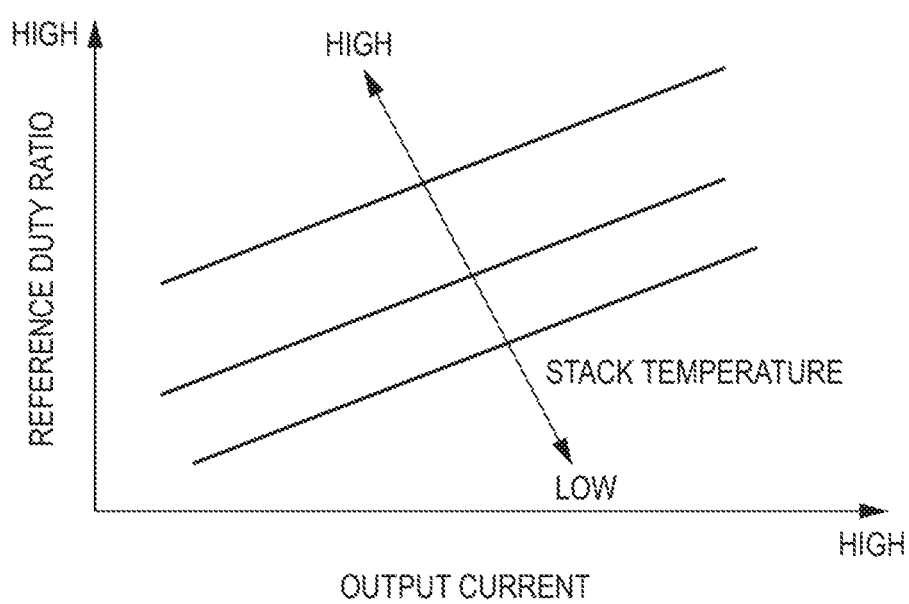
FIG. 5 is a map for computing a reference duty ratio based on a load of the fuel cell stack and a stack temperature.

In the step S100, the controller 4 computes a reference duty ratio based on a load (output current) of the fuel cell stack 1 and a stack temperature by referencing the map of FIG. 5. The reference duty ratio is a duty ratio of the purge valve 36 obtained in advance through experiments and the like, at which electricity can be stably generated from each load by fixing the purging period to a certain value (reference purging period: set to 5 seconds in this embodiment, but may be change appropriately). In other words, the reference duty ratio is a duty ratio of the purge valve 36 at which the hydrogen concentration inside the anode system can be managed to the target hydrogen concentration. It is noted that the reference duty ratio may be computed based on only the load (output current) of the fuel cell stack 1.

In the step S200, the controller 4 performs a process of generating a valve open request signal of the purge valve 36 based on the reference duty ratio. The purge valve open request signal generation process will be described below in detail with reference to FIG. 6.

In the step S300, the controller 4 performs a process of opening/closing the purge valve 36 in practice in the hydrogen supply valve 33 close state (while the anode gas supply stops) based on the purge valve open request signal and the like. This purge valve 36 open/close process will be described below in detail with reference to FIG. 7.

In the step S400, the controller 4 performs a process of estimating the purge flow rate based on each of the pressure decrease levels when the purge valve 36 is opened and when the purge valve 36 is closed during the pulsated depressurization (while the anode gas supply stops). This purge flow rate estimation process will be described below in detail with reference to FIG. 8.

Figure 6:
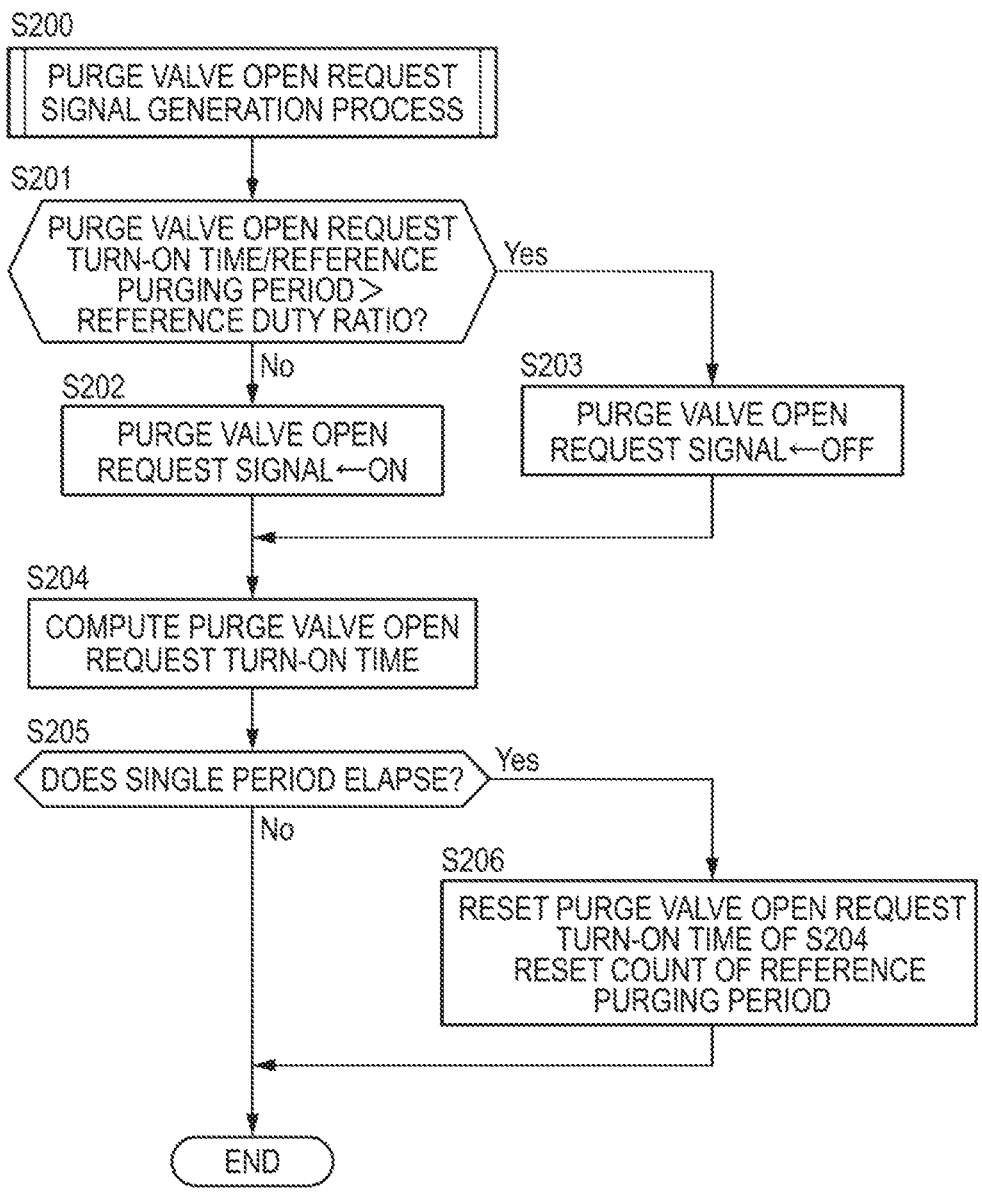
FIG. 6 is a flowchart illustrating a purge valve open request signal generation process in detail.

FIG. 6 is a flowchart illustrating a purge valve open request signal generation process in detail.

In the step S201, the controller 4 determines whether or not a value obtained by dividing an integrated time for which the purge valve open request signal described below is turned on (hereinafter, referred to as a "purge valve open request turn-on time") by a predetermined reference purging period is greater than the reference duty ratio. That is, the controller 4 determines whether or not a proportion of the purge valve open request turn-on time occupied in the reference purging period is greater than the reference duty ratio. The controller 4 performs the process of the step S202 if the division result is equal to or smaller than the reference duty ratio. If the division result is greater than the reference duty ratio, the controller 4 performs the process of the step S203.

In the step S202, the controller 4 turns on the purge valve open request signal.

In the step S203, the controller 4 turns off the purge valve open request signal.

In the step S204, the controller 4 computes the purge valve open request turn-on time by integrating the time for which the purge valve open request signal is turned on.

In the step S205, the controller 4 determines whether or not a single reference purging period elapses. That is, for example, when the reference purging period is set to 5 seconds, it is determined whether or not 5 seconds elapses after the count of the reference purging period starts. If it is determined that a single reference purging period does not elapse, the controller 4 terminates this process. If it is determined that a single reference purging period elapses, the controller 4 processes the step S206.

In the step S206, the controller 4 resets the purge valve open request turn-on time computed in the step S204 to zero, and also resets the count of the reference purging period to zero.

Figure 7:
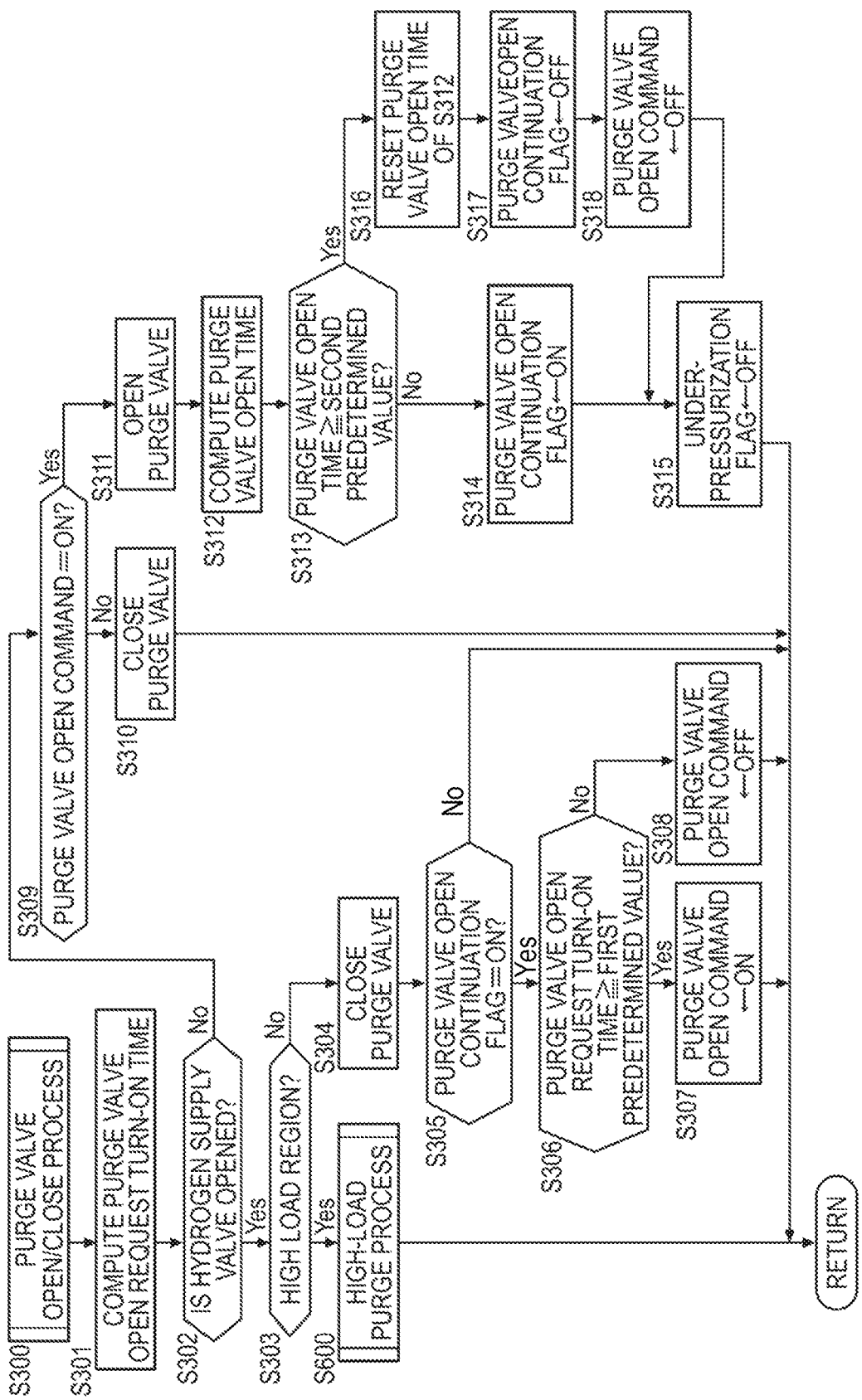
FIG. 7 is a flowchart illustrating a purge valve open/close process in detail.

FIG. 7 is a flowchart illustrating the purge valve open/close process in details.

In the step S301, the controller 4 computes the purge valve open request turn-on time separately from the step S204 described above.

In the step S302, the controller 4 determines whether or not the hydrogen supply valve 33 is opened. The controller 4 processes the step S303 when the hydrogen supply valve 33 is opened, that is, while the anode gas is supplied. Otherwise, when the hydrogen supply valve 33 is closed, that is, while the anode gas supply stops, the controller 4 processes the step S309. According to this embodiment, basically, the determination of the step S302 is performed in order to open the purge valve 36 when the anode gas supply stops.

In the step S303, the controller 4 determines whether or not the operation region of the fuel cell stack 1 is in a high load region. The controller 4 determines that the operation region is in the high load region, for example, when the output current is larger than a current of 20 A. The controller 4 processes the step S600 if the operation region of the fuel cell stack 1 is in the high load region. Otherwise, the controller 4 processes the step S304.

In the step S600, the controller 4 performs a purge valve 36 open/close process in the high load region. This high-load purging process will be described below in detail with reference to FIG. 13. In summary, the liquid water accumulated in the anode system in the high load region increases, compared to a typical region. Due to the structure of the purge valve 36, as the purge valve 36 is opened, first, the liquid water is discharged from the inside of the anode system, and the anode off-gas is then discharged. For this reason, in the high load region, the purge valve 36 can be opened even during the pulsated pressurization, so that the liquid water inside the anode system is reliably discharged from the inside of the anode system, and the anode off-gas is then appropriately discharged from the inside of the anode system.

Meanwhile, if it is determined in the step S303 that the operation region is not in the high load region, the controller 4 closes the purge valve 36 in the step S304.

In the step S305, the controller 4 determines whether or not a purge valve open continuation flag is asserted. If the purge valve open continuation flag is asserted, the controller 4 processes the step S306. If the purge valve open continuation flag is not asserted, the controller 4 terminates this process.

The purge valve open continuation flag is a flag asserted until the purge valve open time while the anode gas supply stops exceeds a second predetermined value set in advance as a time for opening the purge valve 36 in practice when the anode gas supply stops. This purge valve open continuation flag is a flag set to continuously maintain the current purge valve open time without a change, for example, when the purge valve 36 is opened while the anode gas supply stops, and the anode gas supply starts before the second predetermined value elapses. As a result, the purge valve 36 is opened only for the remaining time when the next anode gas supply stops (split purging).

In the step S306, the controller 4 determines whether or not the purge valve open request turn-on time computed in the step S301 is equal to or longer than the first predetermined value set in advance. The controller 4 processes the step S307 if the purge valve open request turn-on time is equal to or longer than the first predetermined value. If the purge valve open request turn-on time is shorter than the first predetermined value, the controller 4 processes the step S308.

In the step S307, the controller 4 turns on the purge valve open command. It is noted that the initial value of the purge valve open command is set to OFF. If the anode gas supply stop time elapses while the purge valve open command is turned on, the purge valve 36 is opened in practice. As a result, it is possible to open the purge valve 36 in synchronization with the close operation of the hydrogen supply valve 33.

In this manner, according to this embodiment, after the purge valve open request turn-on time (=integration value of the reference duty ratio) becomes equal to or longer than the first predetermined value, the purge valve open command is turned on, and the operation for opening the purge valve 36 is allowed. In this embodiment, this enables the anode off-gas to be reliably discharged through the purge valve 36 in the purge valve open state by guaranteeing a certain time for opening the purge valve 36 to reliably perform water drainage in the hydrogen supply valve 33 close state.

In this manner, the reference duty ratio decreases as the output current decreases. Therefore, it is possible to increase the time elapsing until the purge valve open command is turned on as the output current decreases. That is, by changing the interval for outputting the purge valve open command based on the output current, an interval (purging interval) until the purge valve is opened after it is closed increases as the output current decreases. When the output current is low, the cathode pressure is also low. Therefore, the amount of nitrogen and the like transmitted from the cathode side is also small, so that a decrease of the hydrogen concentration inside the anode system is negligible even when the purging interval increases accordingly. For this reason, by increasing the purging interval as long as the output current decreases and collectively discharging the anode off-gas, the anode off-gas is reliably discharged through the purge valve 36 while the purge value 36 is opened.

Meanwhile, if it is determined in the step S306 that the purge valve open request turn-on time is shorter than the first predetermined value, the controller 4 turns off the purge valve open command in the step S308.

Furthermore, if it is determined in the step S302 that the hydrogen supply valve 33 is opened (when the anode gas supply stops), the controller 4 determines whether or not the purge valve open command is turned on in the step S309. If the purge valve open command is turned off, the controller 4 processes the step S310. If the purge valve open command is turned on, the controller 4 processes the step S311.

In the step S310, the controller 4 closes the purge valve 36. In this manner, the purge valve 36 is not opened until the purge valve open request turn-on time is equal to or longer than the first predetermined value even when the anode gas supply stops.

Meanwhile, in the step S311, the controller 4 opens the purge valve 36.

In the step S312, the controller 4 computes the purge valve open time by integrating the time for which the purge valve 36 is opened.

In the step S313, the controller 4 determines whether or not the purge valve open time computed in the step S312 is equal to or longer than a second predetermined value set in advance as a time for opening the purge valve 36 in practice when the anode gas supply stops. In this manner, according to this embodiment, if the purge valve open request turn-on time is equal to or longer than the first predetermined value, the purge valve 36 is opened only for the second predetermined value. Although the first and second predetermined values are set to the same value in this embodiment, they may be set to different values. The first and second predetermined values may be obtained in advance through experiments and the like as a value (for example, 0.5 seconds) at which the hydrogen concentration inside the anode system can be maintained at the target hydrogen concentration, and the purge flow rate can be estimated with high accuracy. The controller 4 processes the step S314 if the purge valve open time is shorter than the second predetermined value. If the purge valve open time is equal to or longer than the second predetermined value, the controller 4 processes the step S316.

In the step S314, the controller 4 asserts the purge valve open continuation flag.

In the step S315, the controller 4 de-asserts the pressurization flag. The pressurization flag is a flag used in the high-load purging process.

Meanwhile, if it is determined in the step S313 that the purge valve open time is equal to or longer than the second predetermined value, the controller 4 resets the purge valve open time computed in the purge valve open/close process to zero in the step S316.

In the step S317, the controller 4 de-asserts the purge valve open continuation flag.

In the step S318, the controller 4 turns off the purge valve open command. Then, the process advances to the step S315, in which the pressurization flag is de-asserted.

Figure 8:
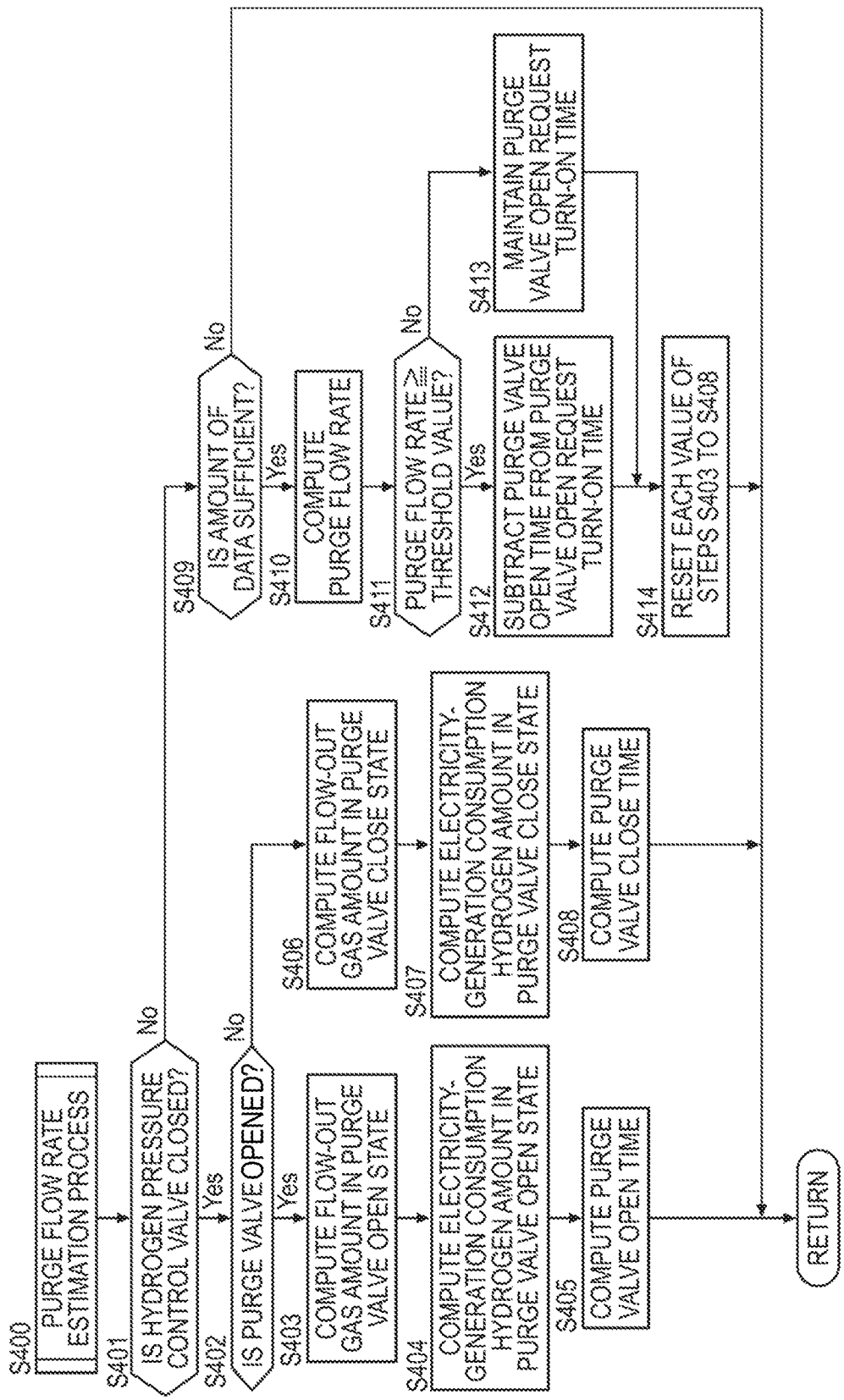
FIG. 8 is a flowchart illustrating purge flow rate estimation process in detail.

FIG. 8 is a flowchart illustrating a purge flow rate estimation process in detail.

In the step S401, the controller 4 determines whether or not the hydrogen supply valve 33 is closed. If it is determined that the hydrogen supply valve 33 is closed, the controller 4 processes step S402 and the subsequent steps for obtaining data for estimating the purge flow rate. Otherwise, if it is determined that the hydrogen supply valve 33 is opened, the controller 4 processes the step S409 and the subsequent steps for estimating the purge flow rate based on the obtained data.

In the step S402, the controller 4 determines whether or not the purge valve 36 is opened. If it is determined that the purge valve 36 is opened, the controller 4 processes the step S403. If it is determined that the purge valve 36 is closed, the controller 4 processes the step S406.

In the step S402, the controller 4 computes the gas amount per operation cycle flowing out from the anode system in the purge valve open state based on a decrease of the anode pressure and adds this gas amount to the previous value to compute the flow-out gas amount in the purge valve open state.

Figure 9:
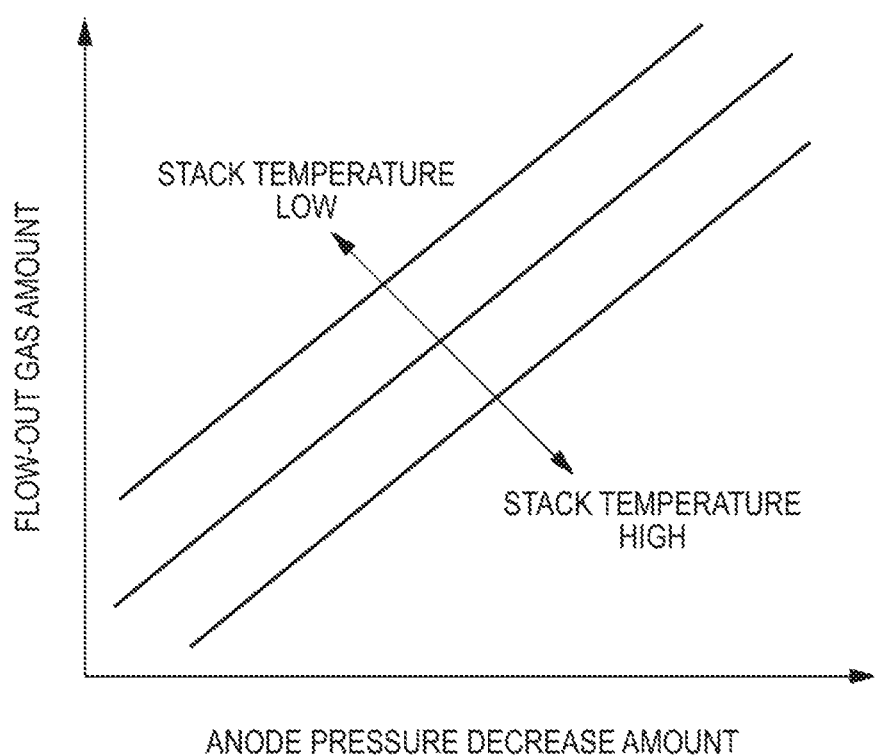
FIG. 9 is a map for computing a gas amount per operation cycle flowing out from the inside of the anode system in a purge valve open state based on an anode pressure decrease amount.

The gas amount per operation cycle flowing out from the anode system in the purge valve open state may be computed based on the anode pressure decrease amount, for example, by creating the map of FIG. 9 in advance through experiments and the like by associating the anode pressure decrease amount (previous anode pressure value−current anode pressure value) and the gas amount flowing out from the inside of the anode system and referencing this map. In FIG. 9, although the gas amount flowing out from the inside of the anode system is corrected based on the stack temperature, the correction using the stack temperature may not necessarily be performed. In addition, it is possible to obtain the gas amount by computing, for example, a change between a molar amount of the gas inside the anode system obtained by applying the previous anode pressure value and the like to an equation of state of the gas and a molar amount of the gas inside the anode system obtained by applying the current anode pressure value and the like to an equation of state of the gas.

In the step S404, the controller 4 computes a hydrogen amount per operation cycle consumed in the fuel cell stack 1 by generating electricity in the purge valve open state based on the detection value (output current) of the current sensor 43 and adds this hydrogen amount to the previous one to compute a electricity-generation consumption hydrogen amount of the purge valve open operation.

Figure 10:
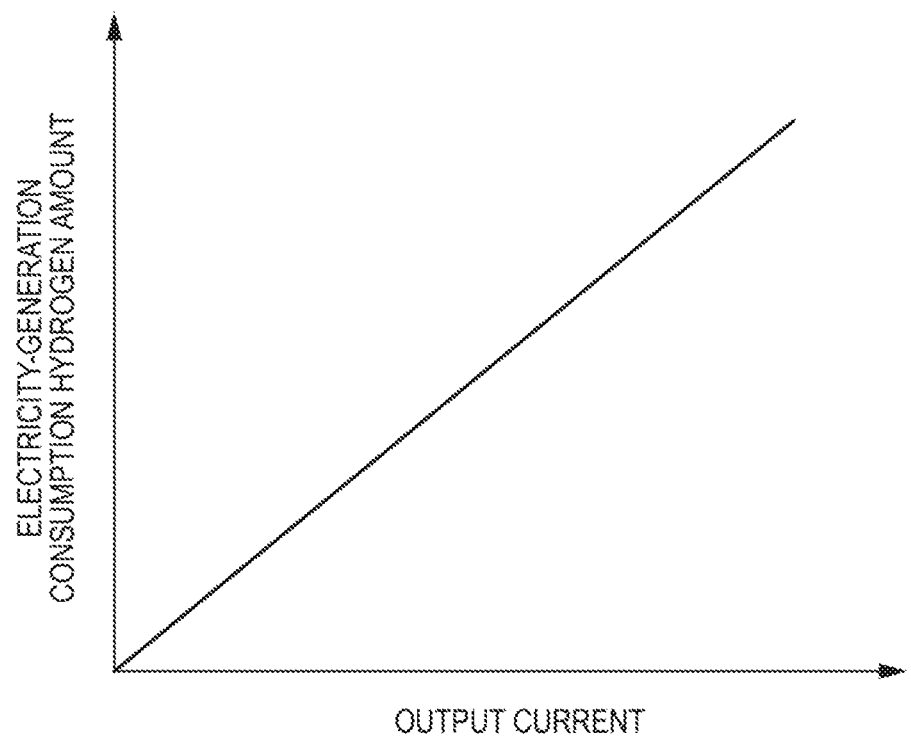
FIG. 10 is a map for computing a hydrogen amount per operation cycle consumed by generating electricity in the fuel cell stack 1 in a purge valve open state based on an output current.

This hydrogen amount per operation cycle consumed in the fuel cell stack 1 by generating electricity in the purge valve open state may be computed, for example, based on the output current by creating, in advance, the table of FIG. 10 obtained by associating the output current and the consumed hydrogen amount through experiments and the like and referencing this table. In addition, it is possible to obtain the hydrogen amount by computing a molar mass of the consumed hydrogen by applying the output current, operation cycle, and the number of fuel cells to a Faraday constant-based formula.

In the step S405, the controller 4 computes the purge valve open time separately from the step S312.

Meanwhile, if it is determined in the step S402 that the purge valve 36 is closed, the controller 4 computes a gas amount per operation cycle flowing out from the inside of the anode system in the purge valve close state based on a decrease of the anode pressure and adds this gas amount to the previous one to compute a flow-out gas amount in the purge valve close state in the step S406.

In the step S407, the controller 4 computes a hydrogen amount per operation cycle consumed in the fuel cell stack 1 by generating electricity in the purge valve close state based on the detection value (output current) of the current sensor 43 and adds this hydrogen amount to the previous one to compute the electricity-generation consumption hydrogen amount of the purge valve close operation.

In the step S408, the controller 4 integrates the time for which the purge valve 36 is closed to compute a purge valve close time.

Furthermore, if it is determined in the step S401 that the hydrogen supply valve 33 is opened, the controller 4 determines whether or not the amount of data for computing the purge flow rate is sufficient in the step S409. Specifically, it is determined whether or not the purge valve open time and the purge valve close time computed in the steps S405 and S408 are respectively longer than a predetermined time (for example, 0.5 seconds) set in advance. If the amount of data is sufficient, the controller 4 processes the step S410. If the amount of data is not sufficient, the controller 4 terminates this process. Therefore, if the amount of data is not sufficient, the purge flow rate is estimated based on the pressure change data of a plurality of pulsation cycles as well as data of a single pulsation cycle.

Figure 11:
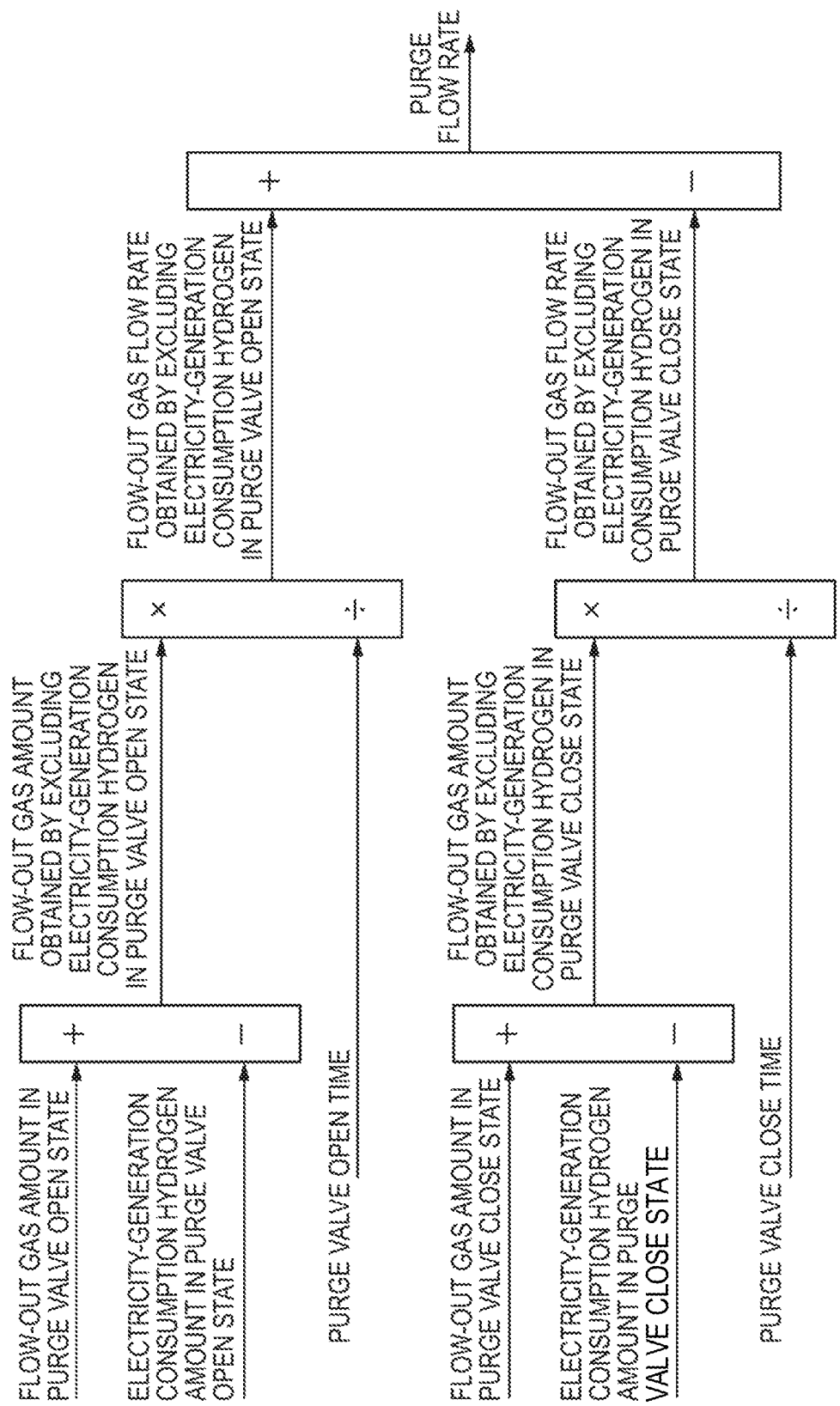
FIG. 11 is a diagram illustrating a purge flow rate computation method.

In the step S410, the controller 4 computes the purge flow rate based on the data obtained in the steps S403 to S408. Specifically, the controller 4 performs computation of FIG. 11 to compute the purge flow rate. As a method of computing the purge flow rate, a value obtained by subtracting a value obtained by dividing the flow-out gas amount of the purge valve close operation by the purge valve close time (flow-out gas flow rate of the purge valve close operation) from a value obtained by dividing the flow-out gas amount of the purge valve open operation by the purge valve open time (the flow-out gas flow rate of the purge valve open operation) may be set to the purge flow rate as described above with reference to FIG. 2. However, if the electricity-generation consumption hydrogen amount of the purge valve open operation is subtracted from the flow-out gas amount of the purge valve open operation in advance, and the electricity-generation consumption hydrogen amount of the purge valve close operation is subtracted from the flow-out gas amount of the purge valve close operation in advance as illustrated in FIG. 11, it is possible to more improve the estimation accuracy of the purge flow rate. This is because the electricity-generation consumption hydrogen amount changes depending on a load change, so that it is difficult to say that the electricity-generation consumption hydrogen amount is constant in the open/close state of the purge valve 36 at all times.

Figure 12:
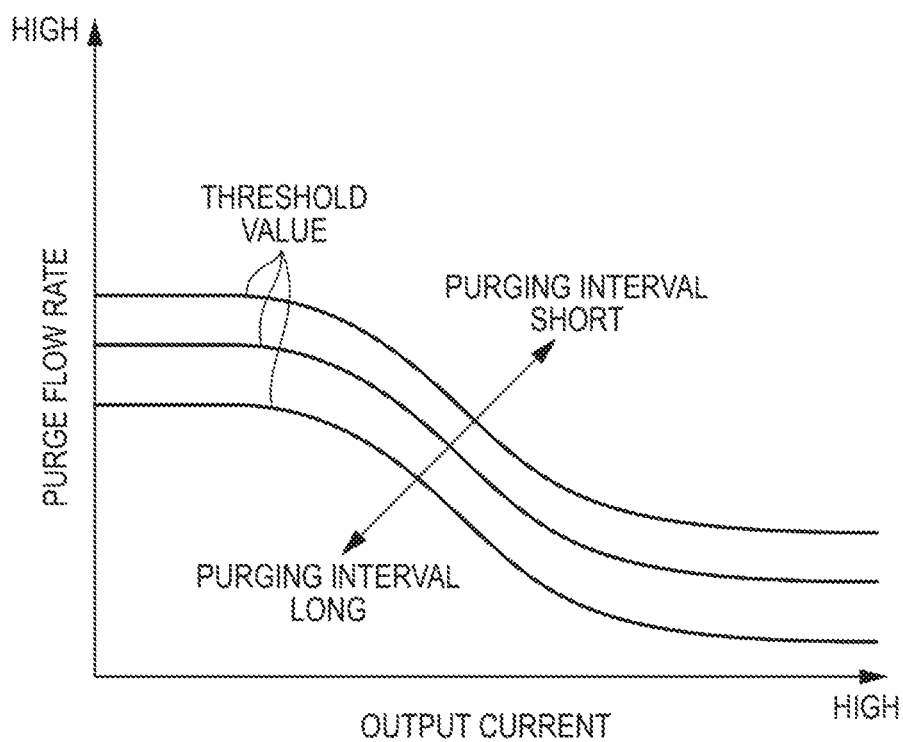
FIG. 12 is a diagram illustrating a threshold value of the purge flow rate.

In the step S411, the controller 4 determines whether or not the computed purge flow rate is equal to or greater than a predetermined threshold value by referencing the table of FIG. 12. In other words, it is determined whether or not the purging amount is sufficient. If the purge flow rate is equal to or greater than the threshold value, the controller 4 processes the step S412. If the purge flow rate is smaller than the threshold value, the controller 4 processes the step S413.

As illustrated in FIG. 12, the threshold value is corrected to decrease as an interval for outputting the purge valve open command (an interval after the purge valve open command is issued until the next purge valve open command is issued, hereinafter, referred to as a "purging interval") increases.

As the purging interval increases, the time period elapsing after the purge valve 36 is opened until the purge valve 36 is opened again increases. Therefore, the amount of liquid water accumulated in the anode system increases. For this reason, as the purging interval increases, the purging amount discharged when the purge valve 36 is opened relatively decreases. According to this embodiment, the purge valve 36 is opened depending on an open/close state of the hydrogen supply valve 33. Therefore, the interval until the purge valve 36 is opened changes. In this case, the purging amount decreases when the purging interval is long compared to a case where the purging interval is short. This is because the amount of liquid water inside the anode system increases as the purging interval increases. Therefore, frequency of determination of purging shortage is reduced by decreasing the threshold value as the interval for issuing the purge valve open command increases.

It is noted that, in order to manage the hydrogen concentration inside the anode system for stably generating electricity, basically, it is necessary to increase the purging amount as the load of the fuel cell stack 1 increases. Referring FIG. 12, it may be conceived that this tendency is reversed because the threshold value decreases as the load of the fuel cell stack 1 increases. However, this is because the purge flow rate is expressed in the ordinate. The purging amount itself obtained by multiplying the purge valve 36 open time corresponding to the reference duty ratio for each load by the purge flow rate increases as the load of the fuel cell stack 1 increases.

In the step S412, the controller 4 subtracts the purge valve open time from the purge valve open request turn-on time computed in the step S301.

In the step S413, the controller 4 maintains the purge valve open request turn-on time computed in the step S301 as it is. This is to perform additional purging in the next process because it is necessary to further perform purging in order to stably generate electricity when it is determined that the purge flow rate is smaller than the threshold value.

In this manner, when the purge flow rate is smaller than the threshold value (when the purging amount is short), the purge valve open time is not subtracted from the purge valve open request turn-on time, so that the purge valve open request turn-on time increases, compared to a case where the purging interval is shorter than the typical value, and the purge flow rate is equal to or greater than the threshold value (when the purging amount is sufficient). As a result, the time for opening the purge valve 36 increases as much as the increase amount, that is, the subtraction cancellation amount.

In the step S414, the controller 4 resets the data of the steps S403 to S408 to zero.

Figure 13:
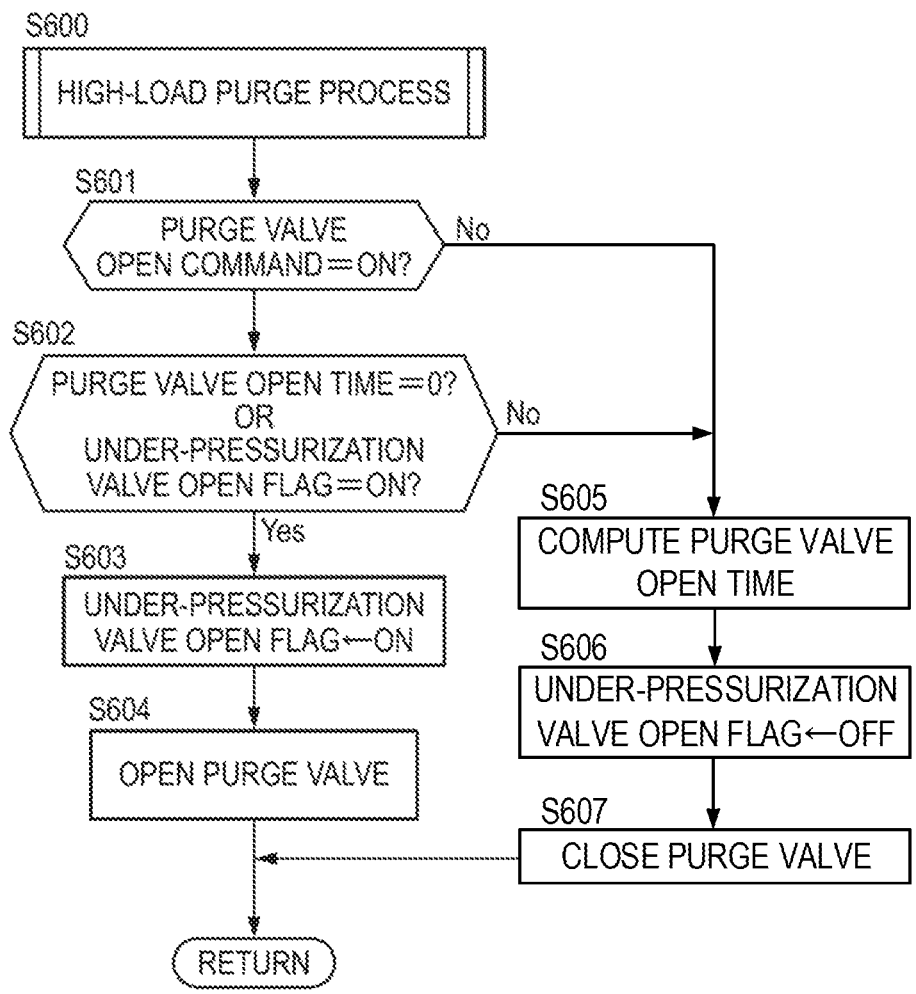
FIG. 13 is a flowchart illustrating a high-load purging process in detail.

FIG. 13 is a flowchart illustrating the high-load purge process in detail.

In the step S601, the controller 4 determines whether or not the purge valve open command is turned on. The controller 4 process the step S602 if the purge valve open command is turned on. If the purge valve open command is turned off, the controller 4 processes the step S605.

In the step S602, the controller 4 determines whether or not the purge valve open time computed in the step S312 is zero, or whether or not the under-pressurization valve open flag is asserted. If any one of the conditions is satisfied, the controller 4 processes the step S603. If both conditions are not satisfied, the controller 4 processes the step S605.

In the step S603, the controller 4 asserts the under-pressurization valve open flag.

In the step S604, the controller 4 opens the purge valve 36.

Meanwhile, if it is determined in the step S601 that the purge valve open command is turned off, the controller 4 computes the purge valve open time by integrating the time for which the purge valve 36 is opened in the step S605.

In the step S606, the controller 4 de-asserts the under-pressurization valve open flag.

In the step S607, the controller 4 closes the purge valve 36.

In this manner, during a high load condition, the purge valve 36 is opened even when the hydrogen supply valve 33 is opened. This is to reliably discharge the liquid water by opening the purge valve 36 from the opening of the hydrogen supply valve 33 because the liquid water inside the fuel cell stack 1 increases during the high load condition. In addition, during the high load condition, since the hydrogen amount consumed by generating electricity increase, an anode pressure decrease rate after closing the hydrogen supply valve 33 increases, and the depressurization time is also shortened. Therefore, if the liquid water discharge efficiency is improved by opening the purge valve 36 during the pressurization, it is possible to reliably discharge the purge gas through the purge valve 36 after the hydrogen supply valve is closed even when the depressurization time is shortened. For this reason, it is possible to improve estimation accuracy of the purge flow rate.

Figure 14A:
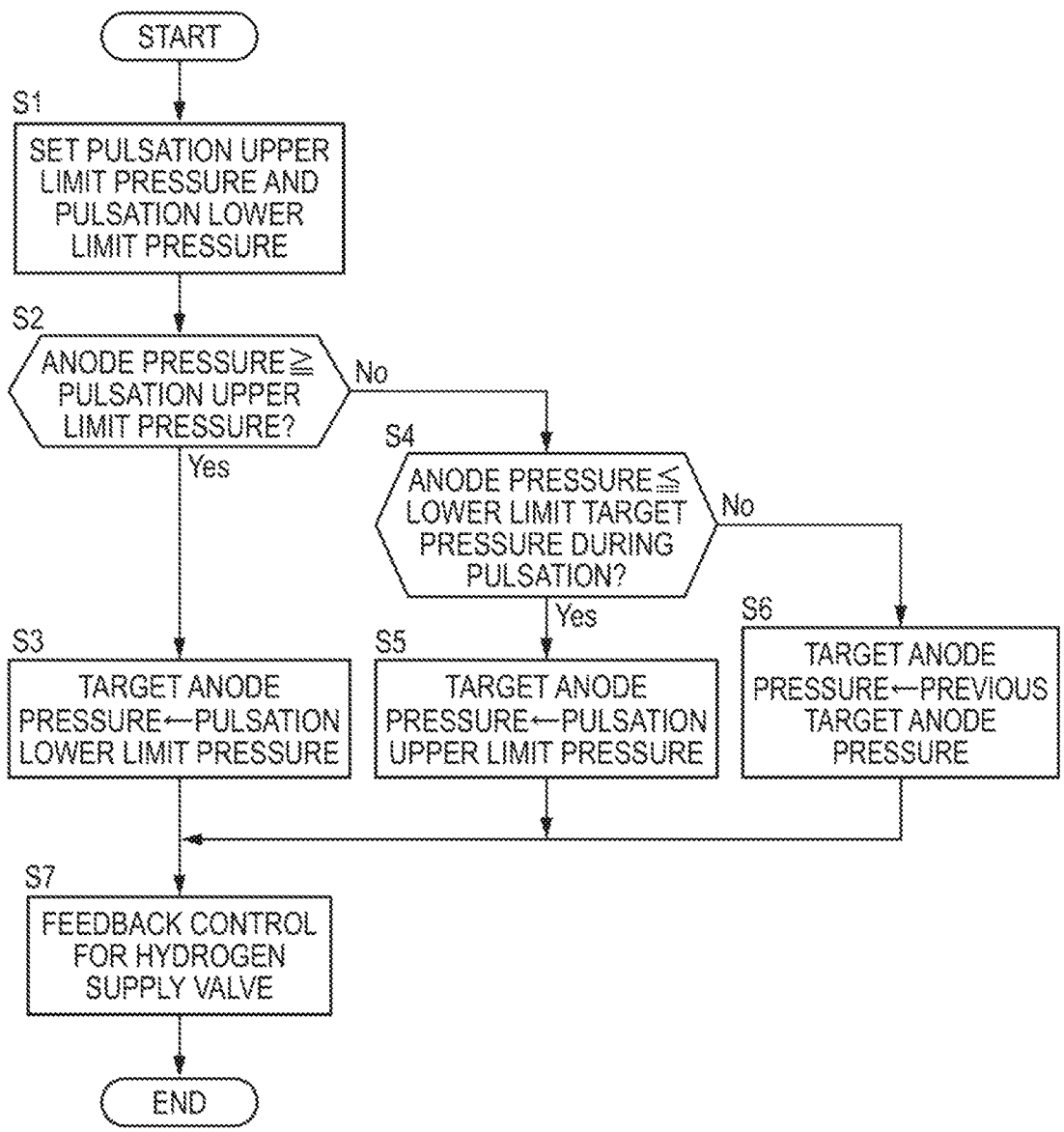
FIG. 14A is a flowchart illustrating a control of the hydrogen supply valve according to an embodiment of this invention.

FIG. 14A is a flowchart illustrating a control of the hydrogen supply valve 33 according to this embodiment.

Figure 14B:
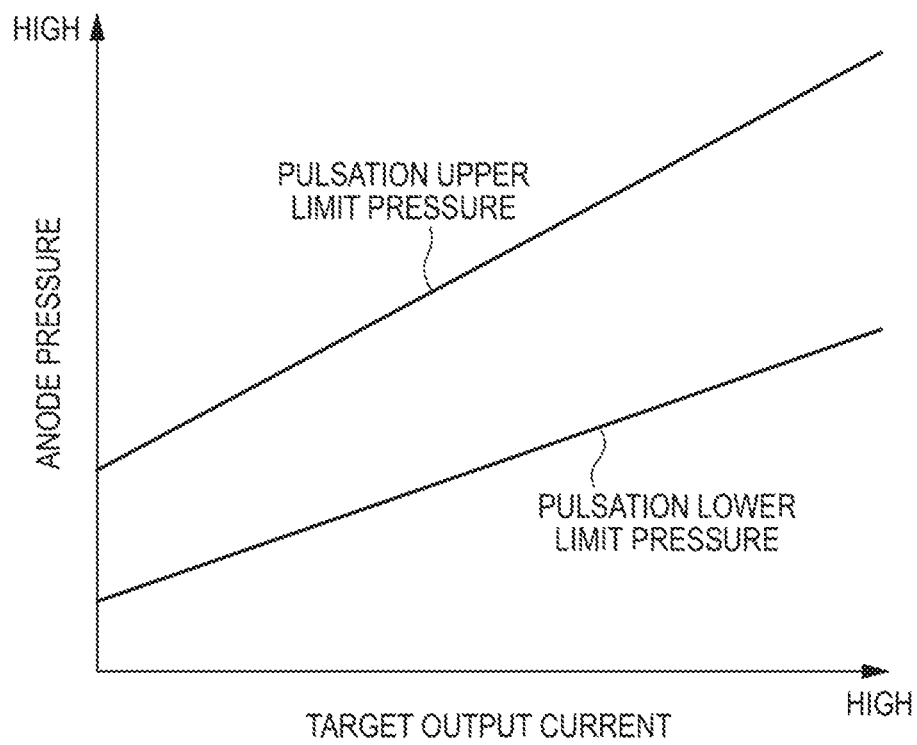
FIG. 14B is a table for computing pulsation upper/lower limit pressures based on a target output current.

In the step S1, the controller 4 sets the pulsation upper limit pressure and the pulsation lower limit pressure of the anode pressure based on a target output current of the fuel cell stack 1 by referencing the table of FIG. 14B.

In the step S2, the controller 4 determines whether or not the anode pressure is equal to or higher than the pulsation upper limit pressure. If the anode pressure is equal to or higher than the pulsation upper limit pressure, the controller 4 processes the step S3 in order to decrease the anode pressure. Otherwise, if the anode pressure is lower than the pulsation upper limit pressure, the controller 4 processes the step S4.

In the step S3, the controller 4 sets the target anode pressure to the pulsation lower limit pressure.

In the step S4, the controller 4 determines whether or not the anode pressure is equal to or lower than the pulsation lower limit pressure. If the anode pressure is equal to or lower than the pulsation lower limit pressure, the controller 4 processes the step S5 in order to increase the anode pressure. Otherwise, if the anode pressure is higher than the pulsation lower limit pressure, the controller 4 processes the step S6.

In the step S5, the controller 4 sets the target anode pressure to the pulsation upper limit pressure.

In the step S6, the controller 4 sets the target anode pressure to the previous target anode pressure.

In the step S7, when the pulsation lower limit pressure is set as the target anode pressure, the controller 4 performs a feedback control for the hydrogen supply valve 33 such that the anode pressure is set to the pulsation lower limit pressure. As a result of this feedback control, typically, the opening level of the hydrogen supply valve 33 is fully closed, so that the anode gas supply from the high-pressure hydrogen tank 31 to the fuel cell stack 1 stops. As a result, the anode pressure decreases due to consumption of the anode gas inside the fuel cell stack 1 for generating electricity or other reasons.

Meanwhile, when the pulsation upper limit pressure is set as the target anode pressure, the controller 4 performs a feedback control for the hydrogen supply valve 33 such that the anode pressure increases to the pulsation upper limit pressure. As a result of this feedback control, the hydrogen supply valve 33 is opened to a desired opening level, and the anode gas is supplied from the high-pressure hydrogen tank 31 to the fuel cell stack 1, so that the anode pressure increases.

Figure 15:
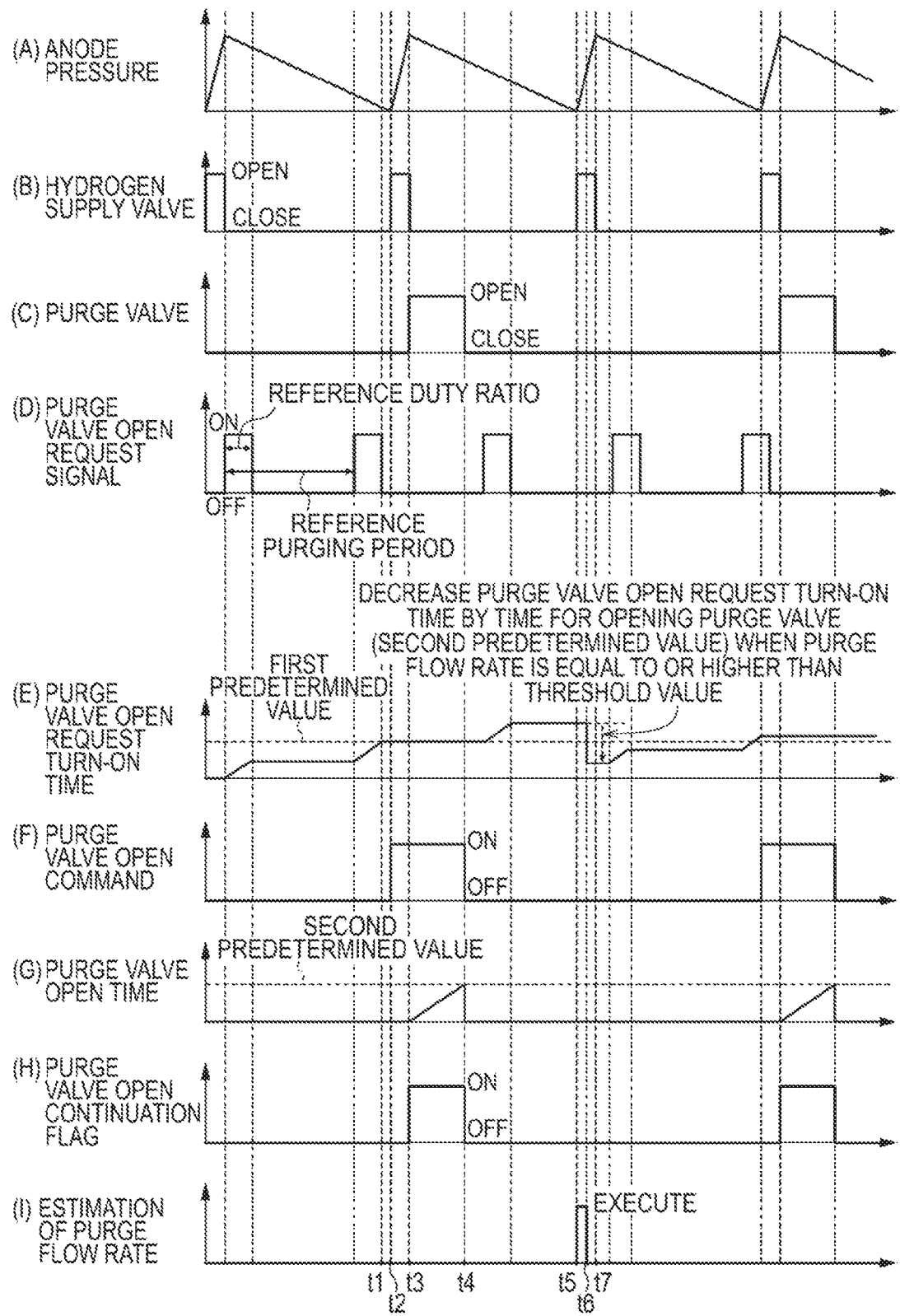
FIG. 15 is a timing chart when the purge flow rate is equal to or higher than a threshold value in a normal operation region.
Figure 16:
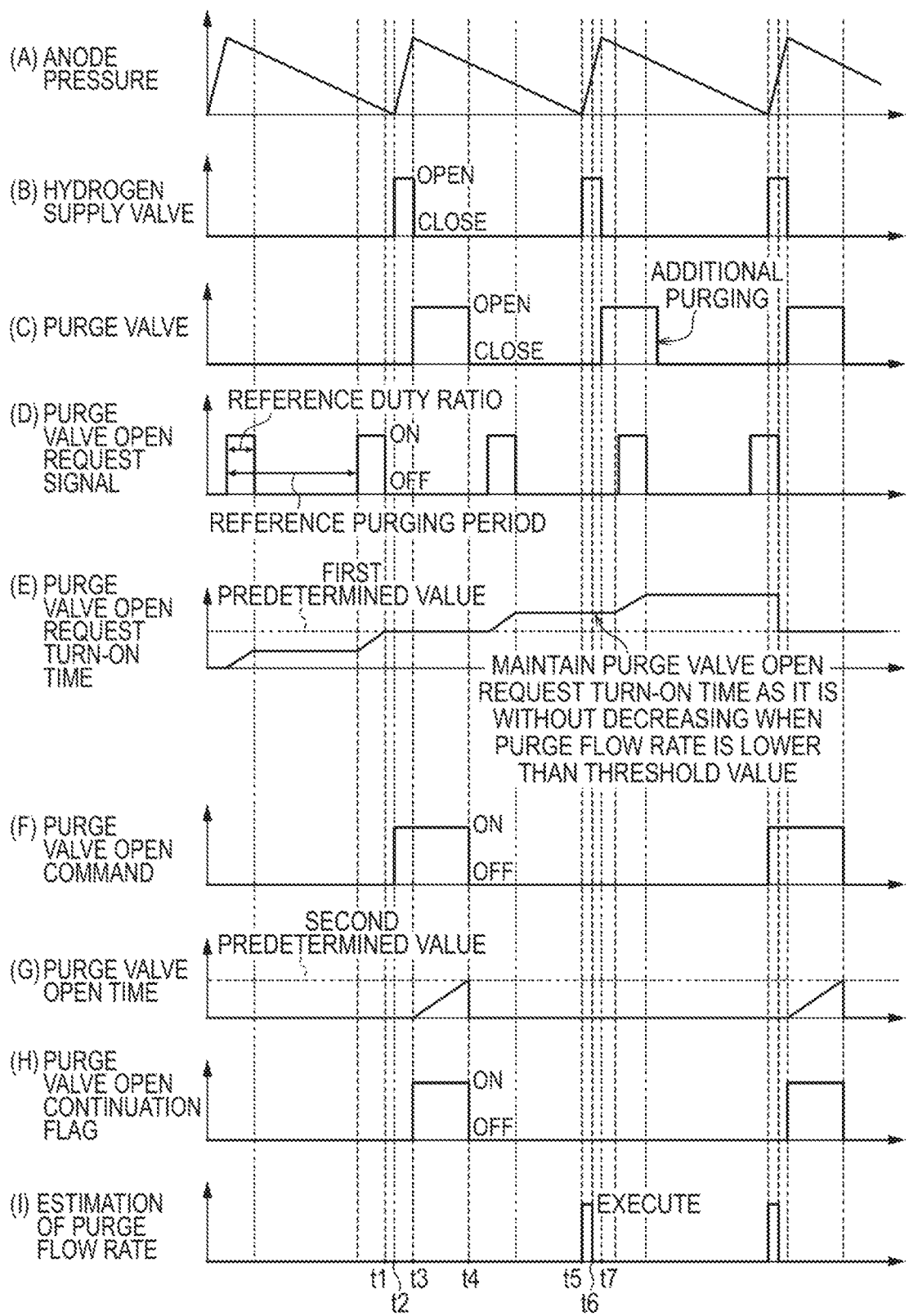
FIG. 16 is a timing chart when the purge flow rate is lower than the threshold value in a normal operation region.

FIGS. 15 and 16 are timing charts illustrating a purge control according to this embodiment. FIG. 15 is a timing chart when the operation region is within a typical region, and the purge flow rate is equal to or higher than the threshold value. Meanwhile, FIG. 16 is a timing chart when the operation region is a typical region, and the purge flow rate is lower than the threshold value.

As illustrated in FIG. 15D, through the purge valve open request signal generation process, the purge valve open request signal is generated such that the purge valve open request signal is turned on only for the reference duty ratio during the reference purging period. In addition, as illustrated in FIG. 15E, the purge valve open request turn-on time is computed by integrating the time for which the purge valve open request signal is turned on.

If the purge valve open request turn-on time is equal to or longer than the first predetermined value at the timing t1, the purge valve open command is turned on (FIG. 15F) when the hydrogen supply valve 33 is opened (FIG. 15B) at the timing t2 subsequent to the timing t1.

In addition, if the hydrogen supply valve 33 is closed while the purge valve open command is turned on at the timing t3, the purge valve 36 is opened (FIG. 15C). As the purge valve 36 is opened, the purge valve open time is computed by integrating the time for which the purge valve 36 is opened as illustrated in FIG. 15. If the purge valve open time is equal to or longer than the second predetermined value at the timing t4, the purge valve open command is turned off (FIG. 15F), and the purge valve 36 is closed (FIG. 15C).

During the purge valve open duration of the timing t3 to t4, the data for estimating the purge flow rate, that is, the flow-out gas amount of the purge valve open operation or the electricity-generation consumption hydrogen amount is computed.

Then, during the purge valve close duration of the timing t4 to t5, the data for estimating the purge flow rate, that is, the flow-out gas amount of the purge valve open operation and electricity-generation consumption hydrogen amount are computed.

If the amount of data is sufficient when the hydrogen supply valve 33 is opened at the timing t5, the purge flow rate is computed based on the obtained data (FIG. 15I).

If the computed purge flow rate is equal to or higher than the threshold value, the purge valve open request turn-on time is reduced only for the purge valve open time (=second predetermined value) at the timing t6 (FIG. 15E). As a result, even when the purge valve open request turn-on time is shorter than the first predetermined value, and the hydrogen supply valve 33 is closed at the timing t7, the purge valve 36 is not opened.

Meanwhile, as illustrated in FIG. 16, if the purge flow rate is lower than the threshold value, the purge valve open request turn-on time is maintained as it is at the timing t6. For this reason, the purge valve open command is turned on at the timing t6, so that the purge valve 36 can be opened at the timing t7. In this manner, if the purge flow rate is lower than the threshold value, it is possible to perform additional purging by opening the purge valve 36 again when the hydrogen supply valve 33 is closed after estimation of the purge flow rate. Therefore, it is possible to manage the hydrogen concentration inside the anode system at which electricity is stably generated.

Figure 17:
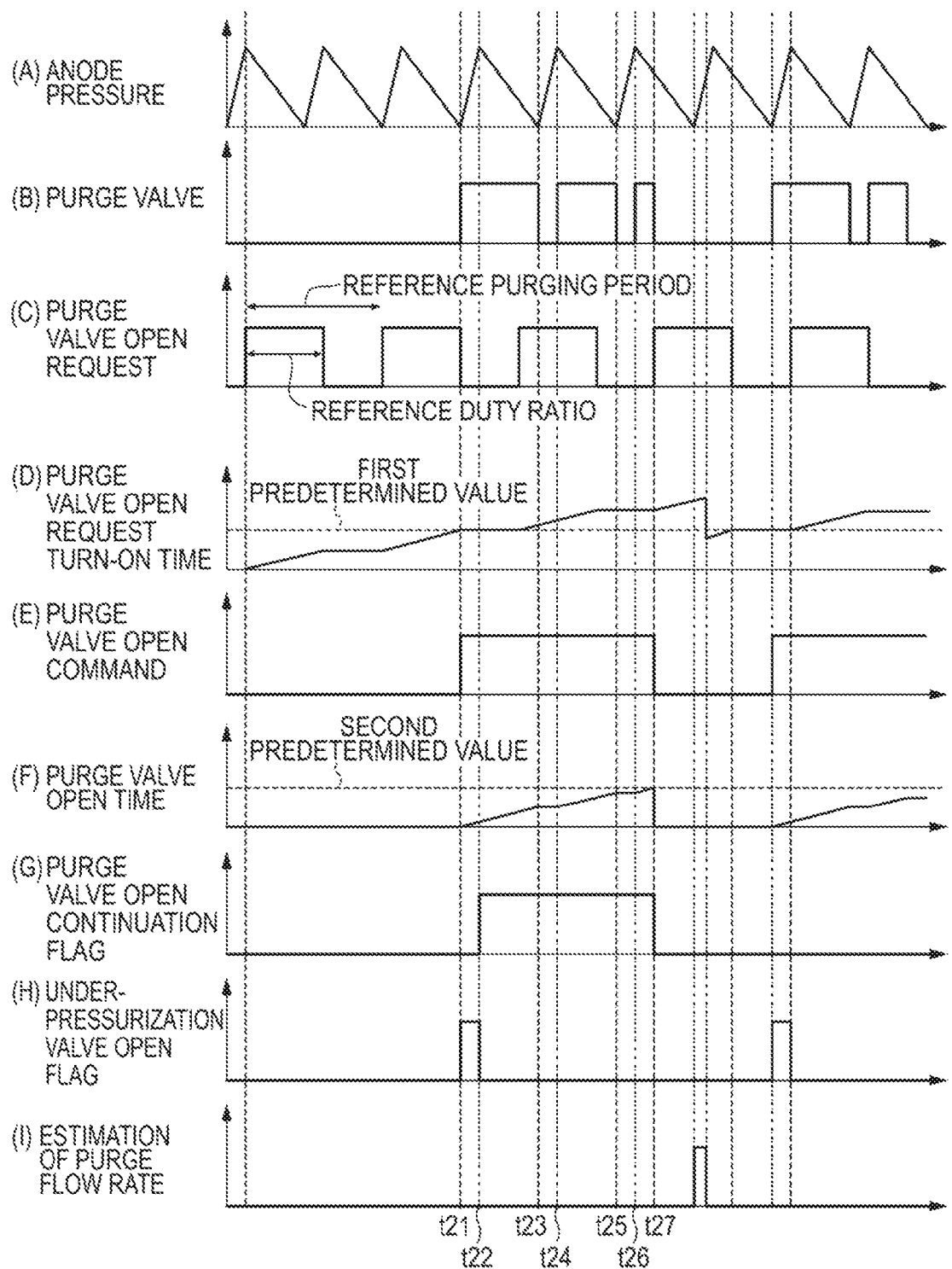
FIG. 17 is a timing chart when the purge flow rate is equal to or higher than the threshold value in a high-load operation region.

FIG. 17 is a timing chart illustrating a purge control according to this embodiment. FIG. 17 is a timing chart when the purge flow rate is equal to or higher than the threshold value when the operation region is in the high-load region.

As illustrated in FIG. 17, when the purge valve open request turn-on time is equal to or longer than the first predetermined value at the timing t21 (FIG. 17D), the purge valve open command is turned on (FIG. 17E). In this case, if the operation region is in the high-load region, it is determined whether or not the purge valve open time is set to zero, or whether or not the under-pressurization valve open flag is asserted through the high-load purging process. At the timing t21, the purge valve open time is set to zero, so that the under-pressurization flag is asserted (FIG. 17H), and the purge valve 36 is opened in the hydrogen supply valve 33 open state (FIG. 17B).

In this manner, by opening the purge valve 36 in the hydrogen supply valve 33 open state during the high load condition, it is possible to reliably discharge the liquid water and reliably discharge the purge gas through the purge valve 36 after the hydrogen supply valve is closed. As a result, it is possible to improve estimation accuracy of the purge flow rate.

As the hydrogen supply valve 33 is closed at the timing t22, the under-pressurization flag is de-asserted (FIG. 17H). In addition, although the hydrogen supply valve 33 is opened at the timing t23, the purge valve open time at this time does not yet reach the second predetermined value (FIG. 17F). For this reason, the purge valve 36 is opened continuously in the hydrogen supply valve 33 close state (FIG. 17B). In addition, the purge valve open time is not reset (FIG. 17F), and the purge valve open command is also maintained at the ON-state (FIG. 17E).

As a result, at the timing t23, it is determined again whether or not the purge valve open time is set to zero, or whether or not the under-pressurization valve open flag is asserted. At the timing t23, since both the conditions are not satisfied, the purge valve 36 is closed in the hydrogen supply valve 33 open state even in the high-load region (FIG. 17B).

As the hydrogen supply valve 33 is closed at the timing t24, the purge valve 36 is opened (FIG. 17B), and the purge valve open time increases again (FIG. 17F).

At the timing t25, the hydrogen supply valve 33 is opened, but since the purge valve open time does not yet reach the second predetermined value (FIG. 17F), the purge valve 36 is maintained in the open state from the timing t24 (FIG. 17B). In addition, the purge valve open time is not reset (FIG. 17F), and the purge valve open command is maintained in the ON-state (FIG. 17E).

As the hydrogen supply valve 33 is closed at the timing t26, and the purge valve open time reaches the second predetermined value at the timing t27 (FIG. 17F), the purge valve open command is turned off (FIG. 17E), and the purge valve 36 is closed (FIG. 17B).

In this manner, when the interval elapsing after the hydrogen supply valve 33 is closed until the hydrogen supply valve 33 is opened is shortened in the high load region, the purge valve open time does not reach the second predetermined value through a single pulsated depressurization try in some cases. In this case, the purge valve 36 open operation is performed in a split manner, and only the initial purging is performed in the hydrogen supply valve 33 open state.

The fuel cell system 100 described above according to this embodiment comprises the hydrogen supply valve 33 (supply valve) that controls a supply of the anode gas to the inside of the anode system, the purge valve 36 that discharges the off-gas from the inside of the anode system, the anode pressure sensor 34 (pressure detecting unit) configured to measure a pressure inside the anode system, and the purge flow rate estimating unit (controller 4) configured to estimate the purge flow rate of the off-gas discharged from the inside of the anode system through the purge valve 36 based on a pressure decrease in the purge valve open state and a pressure decrease in the purge valve close state while the anode gas supply to the anode system stops.

As a result, it is possible to estimate the gas amount discharged from the inside of the anode system based on the pressure decrease in the purge valve 36 open state while the anode gas supply stops, and estimate the gas amount leaking from the inside of the anode system based on the pressure decrease in the purge valve 36 close state while the anode gas supply stops, regardless of the open/close state of the purge valve 36. For this reason, it is possible to estimate the flow rate of the off-gas discharged from the inside of the anode system through the purge valve 36 with high accuracy based on the gas amount discharged from the inside of the anode system and the gas amount leaking from inside of the anode system.

Specifically, the purge flow rate estimating unit comprises a first estimating unit configured to estimate a gas flow rate flowing out from the inside of the anode system for the purge valve open duration based on a pressure decrease of the purge valve open operation, and a second estimating unit configured to estimate a gas flow rate flowing out from the inside of the anode system regardless of the open/close state of the purge valve based on a pressure decrease of the purge valve close operation. The purge flow rate estimating unit estimates the purge flow rate based on the gas amount estimated by the first estimating unit and the gas flow rate estimated by the second estimating unit.

As a result, it is possible to estimate the gas flow rate flowing out from the inside of the anode system based on the pressure decrease of the purge valve close operation regardless of the open/close state of the purge valve. Therefore, it is possible to estimate the flow rate of only the off-gas discharged from the inside of the anode system through the purge valve 36 based on this estimation result and the gas flow rate flowing out from the inside of the anode system in the purge valve open state.

The fuel cell system 100 according to this embodiment comprises a purge valve control unit (controller 4) configured to open/close the purge valve 36 based on the open/close state of the hydrogen supply valve 33 and the load of the fuel cell stack 1.

Specifically, the purge valve control unit changes an interval for issuing the purge valve 36 open command based on the load of the fuel cell stack 1 and opens the purge valve 36 in the hydrogen supply valve 33 close state while the open command is issued.

The purging amount may be insignificant if the load of the fuel cell stack 1 is small. For this reason, when the load of the fuel cell stack 1 is small, it is possible to obtain a nearly constant purging amount discharged in a single try regardless of the load by lengthening the purging interval. In addition, by closing the hydrogen supply valve 33 and opening the purge valve 36, it is possible to reliably open the purge valve when the anode gas supply stops, and obtain the purging amount necessary to estimate the purge flow rate. Therefore, it is possible to reliably detect a pressure decrease in the purge valve open state.

Since the purge valve control unit closes the purge valve 36 in the hydrogen supply valve 33 open state, it is possible to reliably open the purge valve when the anode gas supply stops. Meanwhile, if the load of the fuel cell stack 1 is larger than a predetermined load (in a high load region), and the valve open command is issued, the purge valve 36 is opened even when the hydrogen supply valve 33 is opened. Therefore, even in a high load region where liquid water increases, it is possible to reliably discharge the liquid water from the purge valve 36 and reliably detect a pressure decrease of the purge valve open operation.

Since the purge valve control unit closes the purge valve 36 in the hydrogen supply valve 33 close state based on the purge valve 36 open time, it is possible to close the purge valve 36 when the purge valve open time in the hydrogen supply valve 33 close state reaches a predetermined time (second predetermined value). For this reason, it is possible to reliably close the purge valve in the hydrogen supply valve 33 close state, and reliably detect a pressure decrease in the purge valve close state. As a result, it is possible to reliably estimate the purge flow rate.

The fuel cell system 100 according to this embodiment comprises the determining unit (controller 4) configured to determine whether or not the purging amount is short based on the purge flow rate estimated by the purge flow rate estimating unit. In addition, if it is determined that the purging amount is short, the purge valve control unit reduces the interval for issuing the purge valve 36 open command to be shorter than the interval set based on the load of the fuel cell stack 1.

Specifically, the purge valve control unit computes the valve open request time (reference duty ratio) of the purge valve 36 based on the load of the fuel cell stack 1, and issues the purge valve 36 open command when the integration value of the valve open request time (purge valve open request turn-on time) is equal to or longer than the first predetermined value. If it is determined that the purging amount is not short, the purge valve control unit subtracts the purge valve 36 open time from the integration value of the valve open request time. If it is determined that the purging amount is short, the purge valve control unit maintains the integration value of the valve open request time.

As a result, when the purging amount is short, it is possible to perform additional purging separately from the purging performed based on the load. Therefore, it is possible to suppress a decrease of the hydrogen concentration inside the anode system and continuously generate electricity.

While embodiments of this invention have been described hereinbefore, the embodiments are just for illustrative purposes for the invention, and they are not intended to limit the spirit and scope of this invention to such specific configurations of the embodiments.

For example, although the purge valve 36 is opened simultaneously when the hydrogen supply valve 33 is closed in the aforementioned embodiment, the purge valve 36 may be opened when a predetermined time (for example, 80 ms) elapses after the hydrogen supply valve 33 is closed. As a result, it is possible to reduce an influence on the purge flow rate from a response delay of the hydrogen supply valve 33 or an overshoot of the detection value of the anode pressure sensor 34 and further improve estimation accuracy of the purge flow rate.

Although the detection value of the anode pressure sensor 34 is used as the pressure inside the anode system in the aforementioned embodiment, the pressure inside the anode system may be estimated, for example, based on the opening level of the hydrogen supply valve 33 and the like.

Although the pulsating operation for pulsating the anode pressure is performed in the aforementioned embodiment, the fuel cell system may constantly maintain the anode pressure depending on the load of the fuel cell stack. In this case, the purge valve 36 may be opened/closed during a transient time for decreasing the load (anode pressure decrease time). In addition, the anode pressure may be pulsated primarily.

In the aforementioned embodiment, until the purge valve open time reaches the second predetermined value, the purge valve 36 is opened continuously in the hydrogen supply valve 33 close state, so that the purging is performed in a split manner in a high load condition and the like. In comparison, the purging may be performed in a split manner until the purge valve open time reaches the second predetermined value in the purge valve 36 close state before the hydrogen supply valve 33 is opened.

Although the purge valve 36 is opened in synchronization with the hydrogen supply valve 33 close operation in the aforementioned embodiment, it is not necessary to synchronously perform such an operation.

This application is based on and claims priority to Japanese Patent Application No. 2014-219709 (filed in Japan Patent Office on Oct. 28, 2014), the entire content of which is incorporated herein by reference.

The invention claimed is:

1. A fuel cell system having a fuel cell supplied with an anode gas and a cathode gas to generate electricity from the fuel cell depending on a load, comprising:
   a supply valve for supplying the anode gas into an anode system of the fuel cell system;
   a purge valve for discharging an off-gas from the anode system;
   a pressure detecting unit configured to estimate or measures a pressure inside the anode system; and
   a purge flow rate estimating unit configured to estimate a purge flow rate of the off-gas discharged from the anode system through the purge valve on the basis of a pressure decrease in a purge valve open state and a pressure decrease in a purge valve close state when an anode gas supply into the anode system stops.

2. The fuel cell system according to claim 1, wherein the purge flow rate estimating unit comprises a first estimating unit configured to estimate a gas flow rate flowing out from the anode system for a purge valve open duration on the basis of the pressure decrease in the purge valve open state, and a second estimating unit configured to estimate a gas flow rate flowing out from the anode system regardless of an open/close state of the purge valve on the basis of a pressure decrease in the purge valve close state, and
   the purge flow rate is estimated on the basis of the gas flow rate estimated by the first estimating unit and the gas flow rate estimated by the second estimating unit.

3. The fuel cell system according to claim 1, further comprising a purge valve control unit configured to open/close the purge valve on the basis of the open/close state of the supply valve and the load of the fuel cell.

4. The fuel cell system according to claim 3, wherein the purge valve control unit opens the purge valve in the supply valve close state when the open command is issued, by changing an interval for issuing the purge valve open command on the basis of the load of the fuel cell.

5. The fuel cell system according to claim 4, wherein the purge valve control unit opens the purge valve when a predetermined time elapses after the supply valve is closed.

6. The fuel cell system according to claim 4, wherein the purge valve control unit closes the purge valve in the supply valve open state.

7. The fuel cell system according to claim 6, wherein the purge valve is opened even in the supply valve open operation when the load of the fuel cell is larger than a predetermined load, and the valve open command is issued.

8. The fuel cell system according to claim 4, wherein the purge valve control unit closes the purge valve in the supply valve close state on the basis of the purge valve open time.

9. The fuel cell system according to claim 4, further comprising a determining unit configured to determine whether or not the purging amount is short on the basis of the purge flow rate estimated by the purge flow rate estimating unit,
   wherein the purge valve control unit reduces the interval for issuing the purge valve open command to be shorter than the interval set on the basis of the load of the fuel cell when it is determined that the purging amount is short.

10. The fuel cell system according to claim 9, wherein the purge valve control unit computes a valve open request time of the purge valve on the basis of the load of the fuel cell and issues the purge valve open command when an integration value of the valve open request time is equal to or longer than a first predetermined value, the purge valve control unit subtracts only the purge valve open time from the integration value of the valve open request time if it is determined that the purging amount is not short, and the purge valve control unit maintains the integration value of the valve open request time as it is if it is determined that the purging amount is short.

11. The fuel cell system according to claim 1, wherein the purge flow rate estimating unit estimates the purging amount on the basis of a pressure change when the anode gas supply stops in a plurality of times.

\* \* \* \* \*